(12) United States Patent
Aoyama

(10) Patent No.: US 7,627,197 B2
(45) Date of Patent: Dec. 1, 2009

(54) POSITION MEASUREMENT METHOD, AN APPARATUS, A COMPUTER PROGRAM AND A METHOD FOR GENERATING CALIBRATION INFORMATION

(75) Inventor: Chiaki Aoyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 623 days.

(21) Appl. No.: 10/806,547

(22) Filed: Mar. 23, 2004

(65) Prior Publication Data

US 2004/0196451 A1   Oct. 7, 2004

(30) Foreign Application Priority Data

Apr. 7, 2003   (JP)   ............... 2003-103498
Apr. 15, 2003   (JP)   ............... 2003-110466

(51) Int. Cl.
*G06K 9/32* (2006.01)
*G06K 9/00* (2006.01)
*G01B 9/00* (2006.01)

(52) U.S. Cl. .................. 382/291; 382/103; 382/152; 356/127

(58) Field of Classification Search .................. 382/291
See application file for complete search history.

(56) References Cited

U.S. PATENT DOCUMENTS

| 3,782,822 | A | * | 1/1974 | Spence | ................. 356/21 |
| 4,639,878 | A | * | 1/1987 | Day et al. | ............... 700/259 |
| H0315 | H | * | 8/1987 | Genco et al. | ............ 356/125 |
| 6,312,859 | B1 | * | 11/2001 | Taniguchi | ................. 430/22 |
| 2002/0018589 | A1 | * | 2/2002 | Beuker et al. | ........... 382/132 |
| 2002/0196422 | A1 | * | 12/2002 | Tanabata et al. | ........ 356/3.13 |

FOREIGN PATENT DOCUMENTS

| JP | 05-274426 | 10/1993 |
| JP | 09-287927 | 11/1997 |

* cited by examiner

*Primary Examiner*—Bhavesh M Mehta
*Assistant Examiner*—David P Rashid
(74) *Attorney, Agent, or Firm*—Carrier, Blackman & Associates, P.C.; William D. Blackman; Joseph P. Carrier

(57) ABSTRACT

A method for measuring a position of an object according to an image of the object captured by a camera unit. The method includes the following steps: calculating a discrepancy of an incident beam of light penetrating a lens system of the camera unit relative to an optical center of the lens system, and compensating the position of the object according to the discrepancy.

9 Claims, 18 Drawing Sheets

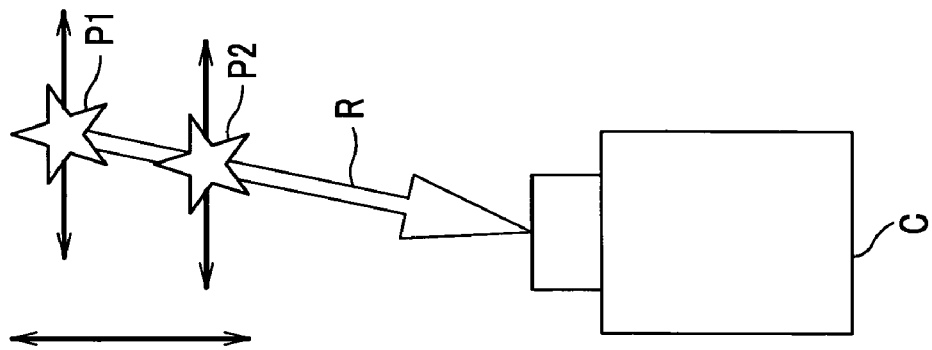
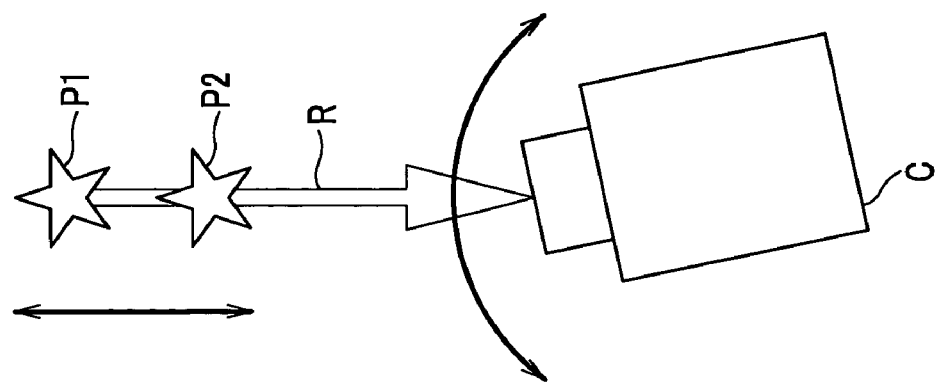

FIG.11

| x | y | dx | dy | dz | α | γ |
|---|---|---|---|---|---|---|
| 0 | 0 | 0.01 | 0.02 | −0.01 | 58.231 | 24.81 |
| 1 | 0 | 0.009 | 0.02 | −0.01 | 58.22 | 24.81 |
| 2 | 0 | 0.009 | 0.02 | −0.01 | 58.219 | 24.81 |
| . | . | . | . | . | . | . |
| . | . | . | . | . | . | . |
| . | . | . | . | . | . | . |
| 768 | 0 | . | . | . | . | . |
| 0 | 1 | . | . | . | . | . |
| 1 | 1 | . | . | . | . | . |
| . | . | . | . | . | . | . |
| . | . | . | . | . | . | . |

POSITION MEASUREMENT METHOD, AN APPARATUS, A COMPUTER PROGRAM AND A METHOD FOR GENERATING CALIBRATION INFORMATION

CROSS-REFERENCE TO RELATED APPLICATIONS

The present invention claims priority under 35 USC 119 based on Japanese patent application No. 2003-103498, filed on Apr. 7, 2003, as well as on Japanese patent application No. 2003-110466, filed on Apr. 15, 2003. The subject matter of each of these priority documents is incorporated by reference herein.

BACKGROUND OF THE INVENTION

1. Field of the Invention

The present invention relates to a technique which provides measurement of the position of an object from an image captured by a camera unit.

2. Discussion of Background Art

Three-dimensional measurement with images has recently been prevailing as a result of development of processing for the image of a CCD camera or a computer. There are examples such as a technique which measures the position of an object with plural cameras, and another one which uses a combination of a camera and a floodlight. The former calculates a distance from the camera to the object with triangulation incorporating a position of each camera and a pixel representative of the object in an image captured by each camera. On the other hand, the latter calculates it with triangulation based on a relative position between the camera and floodlight, and a position of a beam of collimated light in an image captured by the camera. Japanese Published Patent Application 9-287927 reports related arts associated with the latter technique. In this connection, these techniques are based on the assumption that a lens system of the camera can be modeled by a pin-hole camera. As shown in FIG. 1, a model of pin-hole camera is characterized in that only a beam of light coming through a pin-hole H reaches a plane of image, so that a three-dimensional space (x, y, z) is translated into a two-dimensional space (u, v). The model is thus generated on condition that the incident beam of light passes through the pin-hole, focusing an image in the camera.

However, it is known that the image captured by the camera with the lens system has intrinsic non-linear distortion, and the further it departs from the center, the larger the distortion will be. In this way, it is not possible to measure the accurate position of an object from the image having this type of distortion. A technique for improving the accuracy with compensation for the captured image has been proposed. Japanese Published Patent Application 5-274426 reports related arts.

The related arts described above, which make the compensation for the image based on the phenomenon that the peripheral distortion is larger, does not provide fundamental compensation. For example, selecting a matrix of feature points in the center of an image where the distortion is regarded as relatively limited, the technique disclosed by Japanese Published Patent Application 5-274426 calculates a reference point applied to the whole feature points of the image. Because the center is not free from the distortion, the reference point is accordingly calculated from the image having the distortion. In this way, although it may be possible for this technique to improve the accuracy for measurement of a position to some extent, there still remains a problem that the sufficiently accurate position measurement may not necessarily be implemented.

The conventional compensation for the distortion of lens system depends on a distance between the camera and object. If the distance is known, it may be possible to make compensation with a function of compensation for the distortion of image, which varies non-linearly according to the distance. However, it has not yet solved the problem because actually the distance is unknown before the measurement of a position is completed.

SUMMARY OF THE INVENTION

The present invention is directed to overcoming of the problem described above. It seeks to provide a position measurement method, which fundamentally compensates the distortion of an image captured by a camera unit with a lens system and measures the accurate position of an object accordingly, as well as an apparatus, a computer program and a method for generating calibration information to be used for the position measurement method and the apparatus.

According to an aspect of the present invention, a method is provided, which is applied to measurement for a position of an object according to an image of the object captured by a camera unit. The method includes the following steps: calculating a discrepancy of an incident beam of light penetrating a lens system of the camera unit relative to an optical center of the lens system, compensating the position of the object according to the discrepancy, wherein the incident beam of light is directly projected from the object to the lens system; and wherein said discrepancy is a minimum distance between the optical center and said incident beam of light.

The method described above, which calculates the discrepancy of the incident beam of light penetrating the lens system with regard to its optical center, allows recognition of the displacement of the pixel which the camera unit finds representative of the position of the object. In this way, it is possible to detect the accurate position of the object by making compensation according to the displacement of the pixel representative of the position of object with regard to the optical center. In this connection, the optical center is meant to represent the center of the lens system, corresponding to the position of a pin hole in case of a pin-hole camera model.

According to another aspect of the present invention, a method is provided, which is applied to measurement for a position of an object with a combination of an image of the object captured by a camera unit and calibration information. The calibration information is prepared in advance in such a manner that a position of a measurement pixel of the image is correlated with a direction of an incident beam of light and a displacement from a reference point to the incident beam. The method includes the following steps: (a) incorporating the image, (b) detecting a position of a pixel representative of the object in the image incorporated at step (a); and (c) calculating the position of the object according to the direction and the displacement of the incident beam, which are obtained from the calibration information with reference to the position of the pixel detected at step (b).

The method described above, which recognizes the discrepancy of the incident beam of light that impinges on the pixel representative of the object before detection, can detect the accurate position of the object by making compensation according to the discrepancy.

According to still another aspect of the present invention, an apparatus is provided, which measures a position of an object according to an image of the object captured by a camera unit. The apparatus includes an image input means, a pixel position detection means, a storage means for storing calibration information and a position calculation means for calculating the position of the object according to the direction and the displacement of the incident beam of light.

The apparatus described above has the image input means which incorporates the image of the object taken by the camera unit and the pixel position detection means which detects the position of the pixel representative of the object. The apparatus also has the position calculation means which calculates the position of the object according to the direction and the displacement of the incident beam of light that are derived from the calibration information.

According to yet another aspect of the present invention, an apparatus is provided, in which a camera unit includes cameras in sets of at least two so as to take a plurality of images and a storage means stores the calibration information for each camera.

The apparatus described above can recognize the discrepancy of the incident beam of light impinging on the pixel representative of the object of each image before it detects the position of the object according to the plurality of images because the storage means stores the calibration information for each camera. In this way, the apparatus can detect the accurate position of the object by compensation according to the discrepancy.

According to a further aspect of the present invention, an apparatus is provided, in which a pixel position detection means detects a position of a pixel representative of an object that has a marker identifying its typical spot.

The apparatus described above, in which the pixel position detection means detects the position of the pixel according to the marker, can concentrate its effort of detection on the marked spot of the object. The apparatus can detect the accurate position of the object by compensation according to the discrepancy because it recognizes the discrepancy of the incident beam of light impinging on the pixel representative of the marker before it detects the position of the marker in the image. In this connection, it may alternatively be possible to select a spot such as an edge of an object instead of introducing a marker.

According to a still further aspect of the present invention, an apparatus is provided, which further includes a floodlight that projects a collimated beam of light on the object. A camera unit captures an image of the object illuminated by the collimated beam, and the apparatus measures the position of the object according to spatial relationship between a position of the floodlight and an optical center of the camera unit as well as a position of the collimated beam on the image.

The floodlight of the apparatus described above projects the collimated beam of light on the object. The collimated beam may include a spot light beam, a slit light beam in the form of bands and a pattern light beam having a given pattern, as long as it projects a beam of light in a not divergent form. It may also be possible to select a combination of them.

The image input means incorporates the image captured by the camera unit and the pixel position detection means detects the position of the pixel which is illuminated by the collimated beam of light in the image. Furthermore, accessing to the calibration information, the position calculation means obtains the direction and displacement of the incident beam of light representative of the position of the pixel, so that it calculates the position of illumination, namely the position of the object, according to the direction and displacement.

In this way, the apparatus of the present invention can measure the position of the object according to the accurate direction of the incident beam of light penetrating the lens system.

According to a yet further aspect of the present invention, a computer program for a computer used for an apparatus is provided, which generates calibration information correlating a position of a measurement pixel of an image captured by a camera unit with a direction of an incident beam of light and a displacement from a reference point to the incident beam of light, and measures a position of an object according to an image of the object captured by the camera unit and the calibration information. The computer program is executed by the computer in a process comprising: (a) incorporating the image of the object, (b) detecting a position of a pixel representative of the object in the image incorporated at process (a), and (c) calculating the position of the object according to the direction and the displacement of the incident beam of light, which are derived from the calibration information with reference to the position of the pixel detected at process (b).

The computer program described above is executed by the computer so that the image input means can incorporate the image captured by the camera unit and the pixel position detection means can detect the position of the pixel representative of the object in the image. In this way, the position calculation means can obtain the direction and the displacement of the incident beam of light according to the position of the pixel and the calibration information, thereby calculating the position of the object.

According to another aspect of the present invention, a method for generating calibration information is provided, which includes the following steps: projecting a beam of light on individual pixels of a camera image; according to the incident beam of light for each pixel, calculating a displacement from a reference point to the incident beam of light and generating the calibration information by correlating a direction and the displacement of the incident beam of light with a position of each pixel.

The method described above, in which a beam of light is imposed on each pixel of the image, specifies the direction of the incident beam of light for the pixel. In this connection, the direction of the beam of light may be fixed if measurement is conducted for at least two locations of the light source. And the method can provide calculation of a displacement from the reference point to the beam of light, thereby allowing generation of the calibration data correlating the direction and displacement with the position of the pixel. The data has the nature of quantitatively calibrated characteristics of the camera.

According to still another aspect of the present invention, a method for generating calibration information is provided, which includes the following steps: adjusting a first direction of a camera unit and measuring a first relative position of the light source relative to the camera unit, similarly adjusting a second direction of the camera unit and measuring a second relative position of the light source relative to the camera unit, repeating determination of an incident beam of light impinging on the measurement pixel according to the first and second relative positions for predetermined measurement pixels, calculating a displacement from a reference point to the incident beam of light for each of the measurement pixels, and generating the calibration information which correlates a direction and the displacement of the incident beam of light with each of the measurement pixels.

In the method described above, adjustment of the first direction of the camera unit is made by controlling its pan and tilt so that the first peak intensity of light emitted by the light source falls in the measurement pixel captured by the camera unit. In this way, the first relative position of the light source relative to the camera unit is measured. The relative position measured as described above serves as a first position, based on which the incident beam of light impinging on the measurement pixel is determined.

Similarly, the second relative position of the light source is measured and serves as a second position.

In this way, these two relative positions make it possible to determine the incident beam of light impinging on the pixel.

In the method, a step for determining an incident beam of light is repeated according to the number of measurement pixels, and the displacement from the reference point to the incident beam is calculated. In this way, the calibration data is generated, which correlates the direction and displacement of the incident beam of light with the position of each measurement pixel. This leads to quantification of the characteristics of the camera unit.

BRIEF DESCRIPTION OF THE DRAWINGS

FIGS. 4A and 4B are schematic diagrams conceptually illustrating how to generate the calibration information according to the present invention.

FIG. 11 is a schematic diagram illustrating the contents of a calibration table.

DESCRIPTION OF THE PRESENT EMBODIMENTS

Embodiments of the present invention are now described in detail. First, description is given to characteristics of a camera which intrinsically conflict with an idealized assumption of pin-hole camera that incident beams of light cross at a point. This leads to one of the causes for distortion of an image captured by the camera with a lens system. Subsequently, description is given to calibration information (calibration table) of quantified characteristics of the camera, and to a method for generating the calibration information by conducting measurement for individual pixels captured by the camera. And description is given to an apparatus for detecting a position of an object, which can remove distortion of the image.

Non-Pin-Hole Characteristic of a Camera

Figure 1:
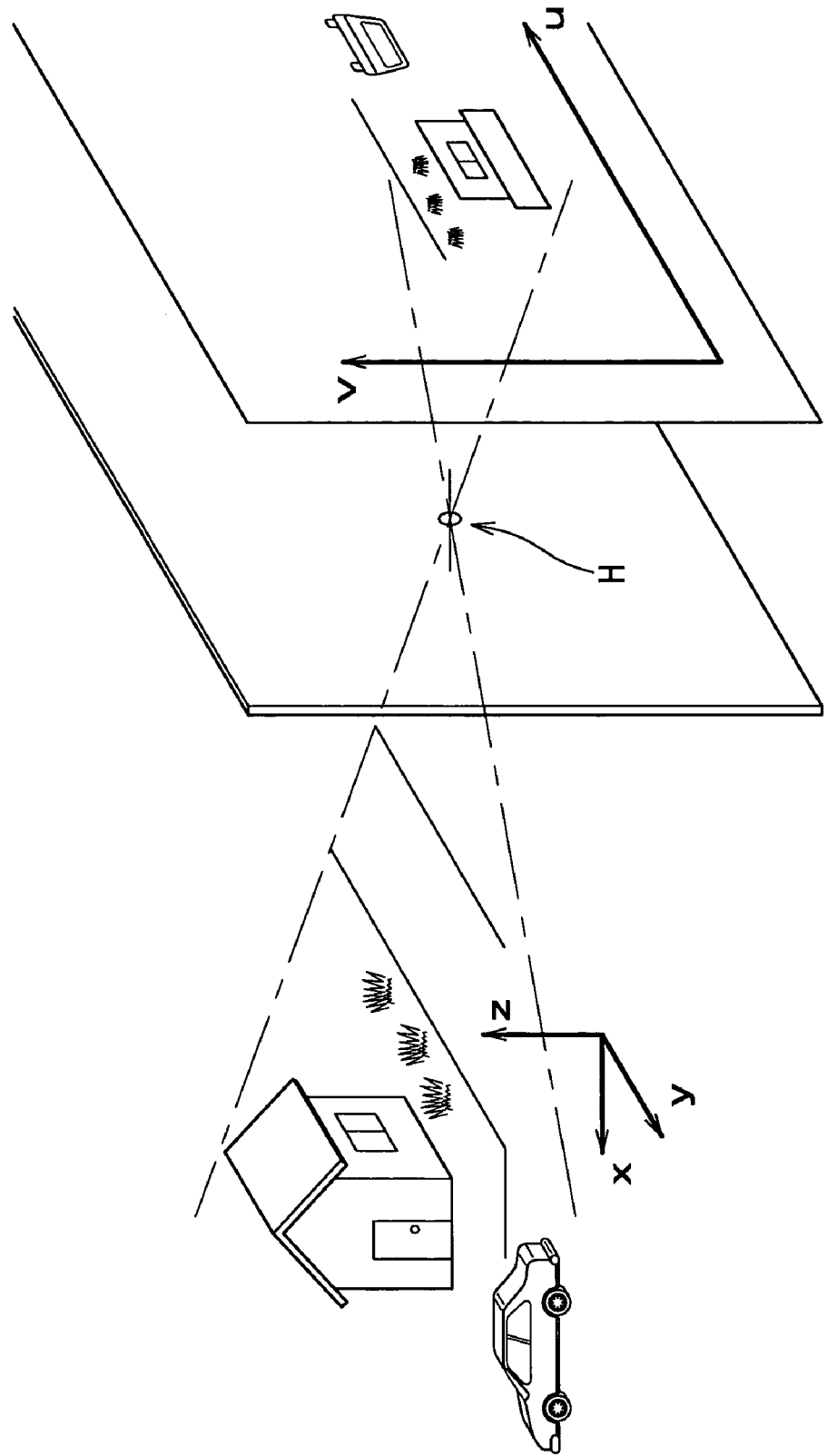
FIG. 1 is a schematic diagram illustrating a pin-hole camera model.
Figure 2:
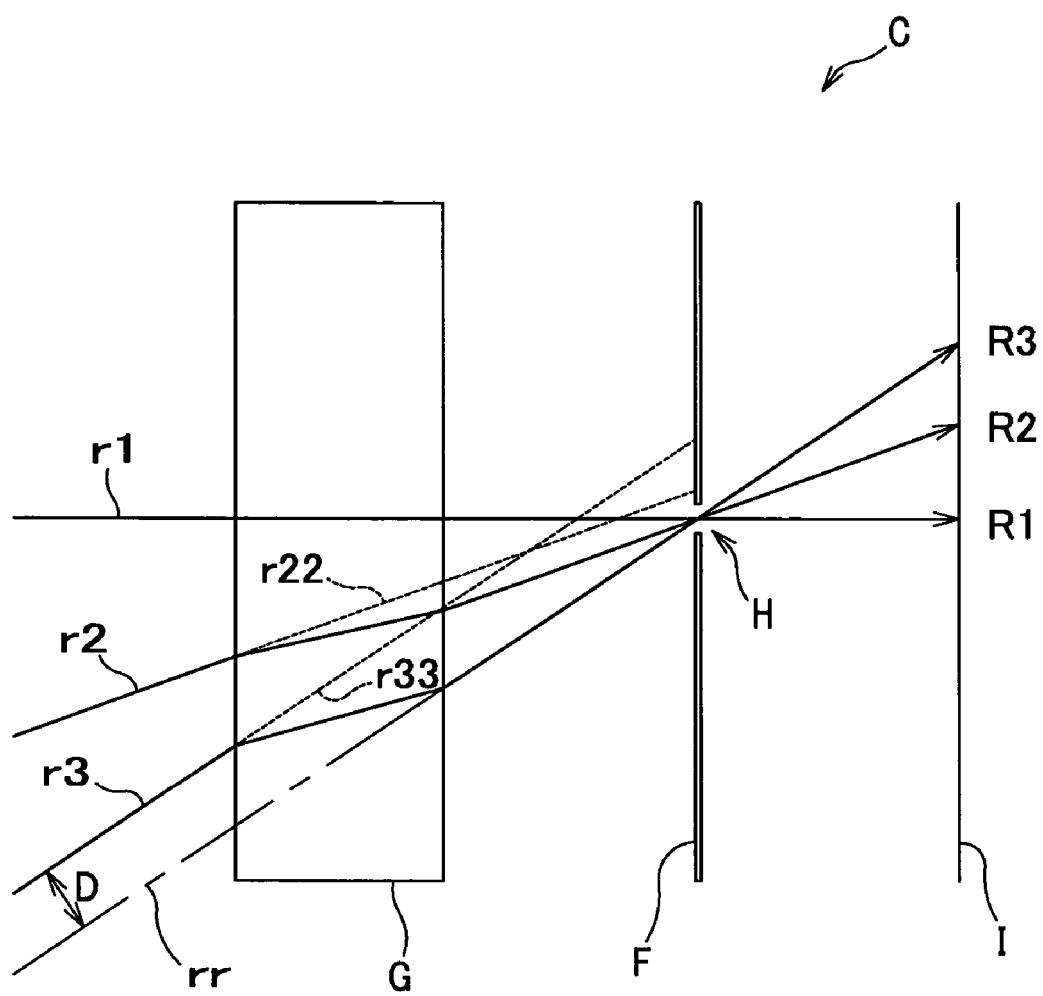
FIG. 2 is a schematic diagram for describing distortion on an image captured by a camera.

Referring to FIG. 2, description is given to a cause for creating distortion on an image captured by a camera with a lens system. FIG. 2 is a schematic diagram of the camera with the lens system. For convenience sake, it is assumed that a lens system of a camera unit C is modeled with a plate glass G and a pin hole H is formed by a diaphragm F. An incident beam of light r1, which perpendicularly penetrates the plate glass G, forms an image on a pixel R1 of an image plane I. Other incident beams of light r2 and r3, which diagonally penetrate the plate glass G, form images on pixels R2 and R3 of the image plane I, respectively.

It is known that the camera unit C cannot be qualified as a pin-hole camera because lines r22 and r33, which are extensions of the incident beams of light r2 and r3 before penetrating the plate glass G, do not intersect with the incident beam of light r1 at one point. In this way, the incident beam of light r3, which is offset by a distance D from an incident beam of light rr, forms the image on the pixel R3.

As described above, the characteristics of a pin-hole camera do not hold in a case of camera, which forms an image with incident beams of light penetrating a lens system (in this case the plate glass G). A camera with a lens system is hereinafter referred to as "non-pin-hole camera".

Calibration Data

Figure 3:
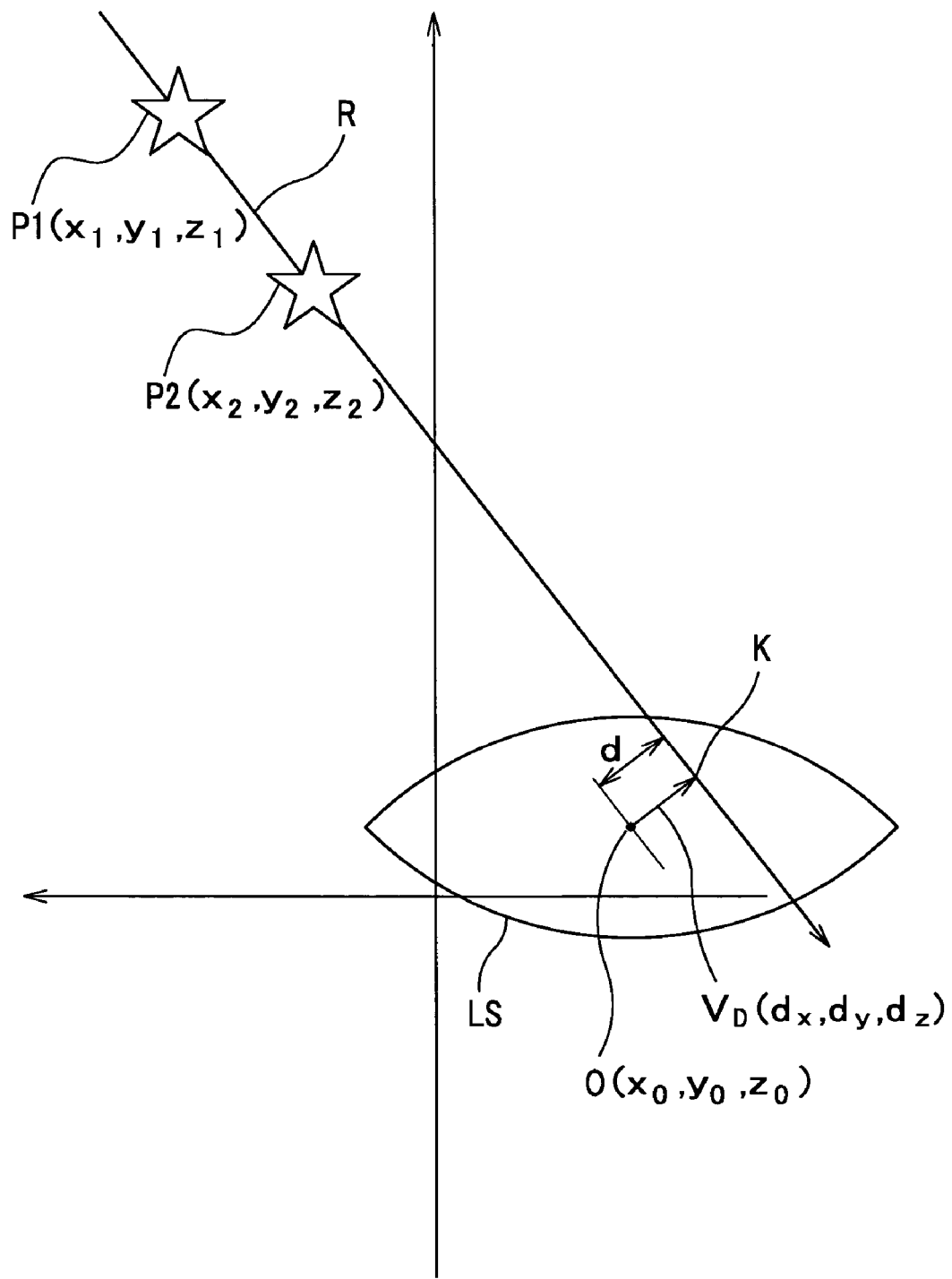
FIG. 3 is a schematic diagram for describing the calibration data.

Referring to FIG. 3, description is given to calibration data including quantified characteristics of a non-pin-hole camera. FIG. 3 is a schematic diagram illustrating a lens system for description of the calibration data. As shown in FIG. 3, an incident beam of light R penetrating a lens LS is defined by two points. It is understood that if beams of light originating from first and second positions P1 and P2 of light source form images on the same pixel (not shown), the incident beam of light R is meant to be identified as an incident beam of light representative of the pixel.

An optical center O is defined so that the sum of squares of distances between all incident beams of light R and the optical center O can take a minimum value. On the other hand, a base point K of an incident beam of light R is defined as a point where a distance d between the incident beam of light R representative of a pixel and the optical center O takes a minimum value.

In other words, the optical center $O(x_0, y_0, z_0)$ is calculated with least-square method applied to the sum of squares of distances d relative to the incident beams of light R, which are defined by the first and second positions of light sources $P1(x_1, y_1, z_1)$ and $P2(x_2, y_2, z_2)$. The sum of squares is represented by an expression (1).

$$d^2 = -(A^2/B) + C \qquad (1)$$

where A, B and C are defined as:

$$A=(x_2-x_1)(x_1-x_0)+(y_2-y_1)(y_1-y_0)+(z_2-z_1)(z_1-z_0)$$

$$B=(x_2-x_1)^2+(y_2-y_1)^2+(z_2-z_1)^2$$

$$C=(x_1-x_0)^2+(y_1-y_0)^2+(z_1-z_0)^2$$

As described above, the characteristics of a non-pin-hole camera can be quantified by introducing the calibration data, which correlates a direction defined by the first and second positions P1 and P2 of light source for a position of pixel with a displacement from the optical center O to the base point K. In this connection, the displacement is represented by a three-dimensional vector $V_D(d_x, d_y, d_z)$.

It is understood that other types of calibration data may alternatively be selected. In the example described above, the vector $V_D$ is defined as a displacement originating from the optical center O of a reference point perpendicular to an incident beam of light. It may alternatively be possible to adopt any reference point as long as it is spatially fixed relative to the camera. It may also be possible to select any vector for the vector $V_D$ as long as it originates from the reference point to an arbitrary point on the incident beam of light.

Method for Generating Calibration Information (Table)

Referring to FIGS. 4A and 4B, a method for generating calibration information (table) is described, which correlates data produced by quantification of characteristics of a non-pin-hole camera with a pixel. FIGS. 4A and 4B are schematic diagrams showing the principle of generating the calibration information. FIG. 4A illustrates conceptually how to measure the calibration data for a given incident beam of light by changing pan and tilt of the camera. In contrast to this, FIG. 4B illustrates a method of measuring the calibration data for a fixed camera by changing the incident beam of light.

As shown in FIG. 4A, the calibration information is generated by specifying a direction of incident beam of light R imposed on a pixel of the camera unit C in the following steps: moving the position of a light source in one direction, one-axis direction defined by the positions P1 and P2 of light source; determining the incident beam of light R defined by the positions P1 and P2; and adjusting the pan and tilt of camera unit C in two axes so that the beam of light R can impinge on the pixel (measurement pixel).

As shown in FIG. 4B, it may alternatively be possible to specify the direction of incident beam of light R which is defined by the positions of P1 and P2 of light source impinging on the measurement pixel in the following manner. The positions P1 and P2 are respectively moved in X, Y and Z directions (three-axis directions) so that the incident beam of light R can impinge on the measurement pixel, while the camera unit C is fixed.

Introducing one of the methods described above shown in FIG. 4A or FIG. 4B, the calibration table is generated from the incident beam of light R specified for the measurement pixel. As shown in FIG. 3, the table correlates the direction of incident beam of light R and the displacement $V_D$ from the optical center O to the base point K with the measurement pixel.

Calibration Information Generator

Figure 5:
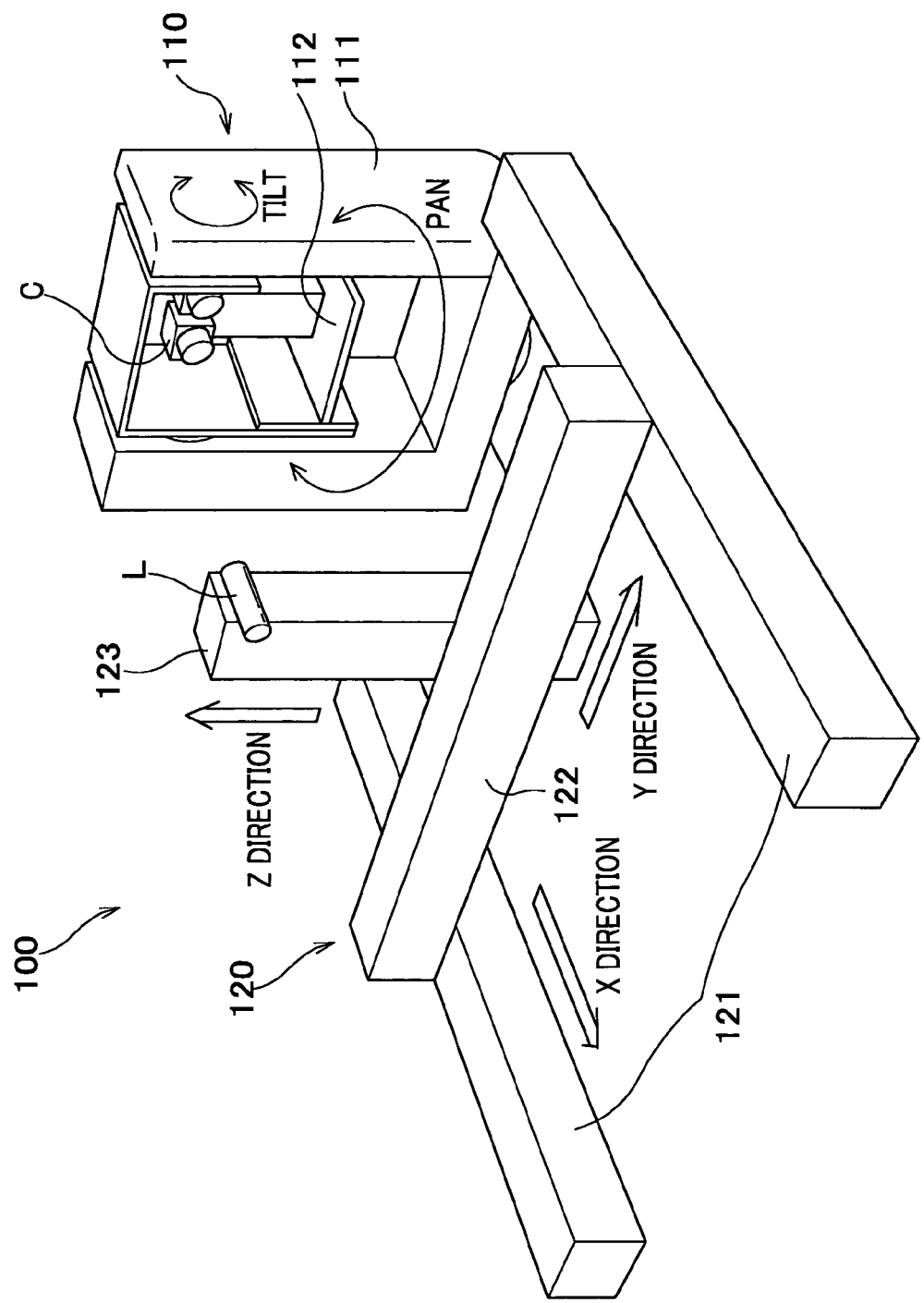
FIG. 5 is a perspective view showing an overall apparatus for generating data for calibration information.

Referring to FIG. 5, the structure of a calibration information generator is described, to which a method for generating calibration information according to the present invention is applied so as to prepare it. FIG. 5 is a perspective view showing the calibration information generator.

A calibration information generator 100 includes a camera support table (rotatable stage) 110, which can support a camera unit C and rotate it in pan and tilt directions. The generator 100 also includes a three-dimensional table (XYZ stage) 120, which can move a point light source L in three-dimensional directions, forward-backward, right-left and upward-downward, relative to the camera support table 110.

The camera support table 110 includes a pan table 111 which is able to rotate about a vertical axis on a horizontal plane, and a tilt table 112 mounted rotatably to the pan table 111 about a horizontal axis. The camera unit C is mounted to the tilt table 112.

The three-dimensional table 120 has an X-axis rail 121 which is laid out in a forward-backward direction on a horizontal plane relative to the camera support table 110, and a Y-axis rail 122 which is laid out in a right-left direction and able to move in the forward-backward direction on the X-axis rail 121, and a Z-axis rail 123 which is laid out in a vertical direction and able to move in a right-left direction. The point light source L is movably mounted to the Z-axis rail 123 in an upward-downward direction.

The pan table 111 and tilt table 112, which are driven by a driving unit such as a pulse motor (not shown), are able to swing the optic axis of camera unit C in upward-downward and right-left directions, respectively. A rotational angle detector such as a rotary encoder (not shown), which measures the angle of optic axis for the camera unit C, is attached to a rotational shaft for each of the pan table 111 and tilt table 112.

The Y-axis rail 122, Z-axis rail 123 and point light source L are able to linearly move on their corresponding rails on which they are mounted because they are driven by converter mechanisms (not shown), which convert the angular movement of pulse motors into linear one.

It is understood that the driving unit and converter mechanism are controlled by a control unit (not shown), and the angle of optic axis for camera unit C and the position of point light source L are arranged so that the control unit can access to them.

Operation of a Calibration Information Generator

Figure 6:
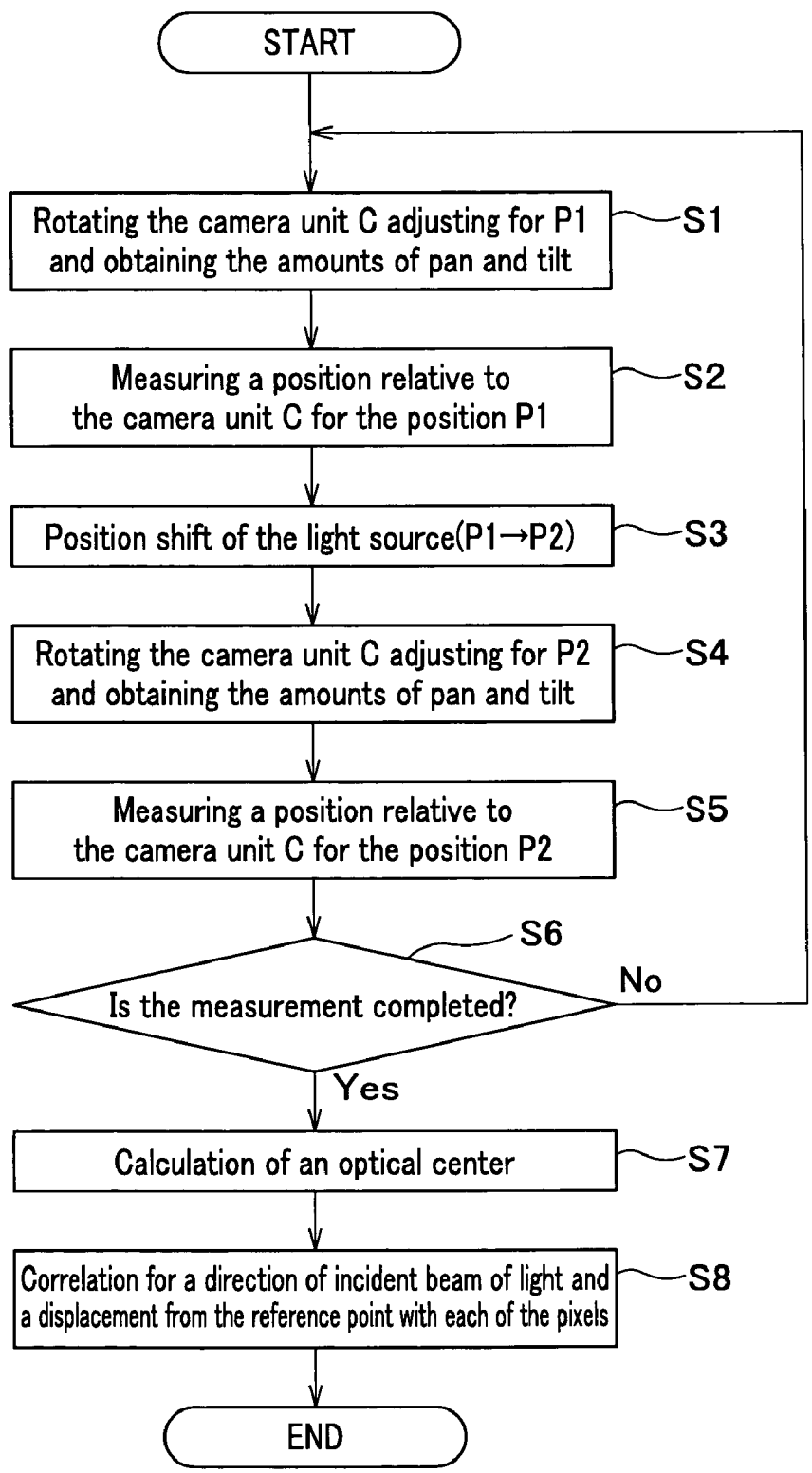
FIG. 6 is a flow chart showing steps for generating data for calibration by a calibration information generator.

An example of operation of a calibration information generator 100 is described with reference to FIG. 6, in addition to FIGS. 4A, 4B, and 5. FIG. 6 is a flow chart showing steps for generating a calibration table by the calibration information generator 100 with the method shown in FIG. 4A.

At a step S1, the calibration information generator 100 sets a point light source L at a predetermined position, a position P1 of light source, and makes rotations for a pan table 111 and a tilt table 112 about individual two axes so that a beam of light originating from the point light source L located at the position P1 can impinge on a measurement pixel of a camera unit C, thereby obtaining the resultant amounts of pan and tilt. Subsequently at a step S2, the generator 100 measures a position relative to the camera unit C for the position P1 according to the amounts of pan and tilt.

At a step S3, the generator 100 makes one-axis movement for a Y-axis rail 122 on an X-axis rail in a direction of X, forward or backward, thereby shifting the point light source L from the position P1 to a position P2.

At a step S4, the generator 100 obtains another set of amounts of pan and tilt for the position P2 in the similar manner as that of the step S1. Subsequently at a step S5, the generator 100 measures a relative position for the position P2.

It is possible to specify an incident beam of light R impinging on the measurement pixel according to the respective relative positions obtained for the positions P1 and P2 at the steps S2 and S5, respectively.

Figure 7:
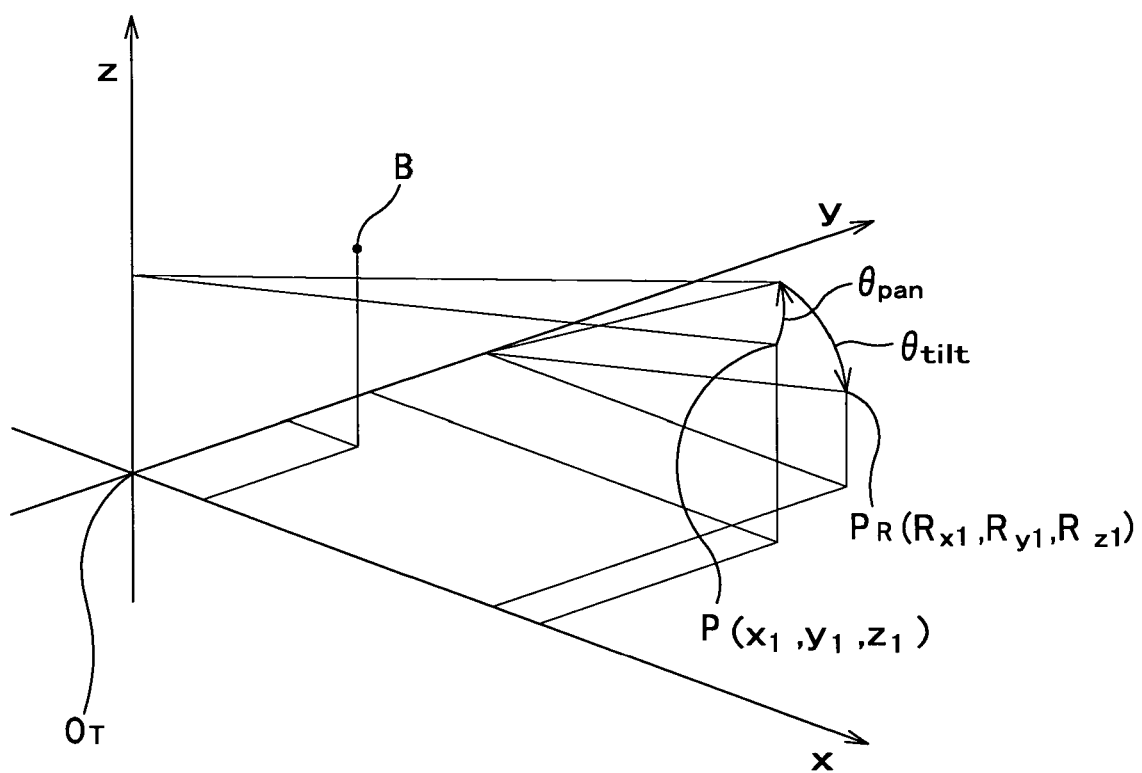
FIG. 7 is a diagram illustrating a position of light source relative to a camera when the camera is panned and tilted.

Referring to FIG. 7 as well as FIGS. 4A, 4B and 5, a method for calculating a position of light source relative to the camera unit C is described. FIG. 7 is a diagram illustrating a position of light source relative to a camera when the camera is panned and tilted.

It is assumed that the camera unit C is mounted on a fixed reference point B of the camera support table 110. If the camera support table 110 or the camera unit C is rotated by a pan of $-\theta_{pan}$ and a tilt of $-\theta_{tilt}$, a direction of light source as viewed from the camera unit C will coincides with one which occurs when the light source is rotated about a rotational center $O_T$ of the camera support table 110 by $\theta_{pan}$ and $\theta_{tilt}$.

Assuming that coordinates of the position of a light source before rotation are defined as $P(x_1, y_1, z_1)$, and amounts of pan and tilt $\theta_{pan}$ and $\theta_{tilt}$, respectively, then a position $P_R(R_{x1}, R_{y1}, R_{z1})$ of the light source after rotation can be represented by an expression (2).

$$\begin{pmatrix} R_{x1} \\ R_{y1} \\ R_{z1} \end{pmatrix} = \begin{pmatrix} \cos\theta_{tilt}\cos\theta_{pan} & -\cos\theta_{tilt}\sin\theta_{pan} & \sin\theta_{tilt} \\ \sin\theta_{pan} & \cos\theta_{pan} & 0 \\ -\sin\theta_{tilt}\cos\theta_{pan} & \sin\theta_{tilt}\sin\theta_{pan} & \cos\theta_{tilt} \end{pmatrix} \begin{pmatrix} x_1 \\ y_1 \\ z_1 \end{pmatrix} \quad (2)$$

In this way, it is possible to specify the incident ray of light impinging on a measurement pixel by calculating relative positions for the two positions of the light source after the rotation of camera support table 110. Defining coordinates of the position P1 as $(x_{p1}, y_{p1}, z_{p1})$ and P2 as $(x_{p2}, y_{p2}, z_{p2})$, which are translated into relative positions, the incident beam of light is specified by an expression (3) with a real number of t.

$$\begin{pmatrix} x \\ y \\ z \end{pmatrix} = t \begin{pmatrix} x_{p2} - x_{p1} \\ y_{p2} - y_{p1} \\ z_{p2} - z_{p1} \end{pmatrix} + \begin{pmatrix} x_{p1} \\ y_{p1} \\ z_{p1} \end{pmatrix} \quad (3)$$

Returning to FIG. 6, the description of flow is resumed.

At a step S6, the calibration information generator 100 judges whether or not measurement is completed for a predetermined number of measurement pixels. If it is not completed (No), the flow returns to the step S1 and the generator 100 continues specifying another incident beam of light for the next measurement pixel. If it is completed (Yes), the generator 100 calculates, at a step S7, an optical center according to the directions of incident beams of light which are obtained for the predetermined number of measurement pixels.

At a step S8, the generator 100 generates a calibration table, which correlates a direction of incident beam of light and a displacement from the reference point with each of the pixels. It is noted that the generator 100 executes correlation by interpolation according to the data of nearby measurement pixels for other pixels which are not subjected to measurement. In this connection, it may be preferable to select the positions of measurement pixels in advance, taking into account the characteristics of the lens of camera unit C. For example, it may be preferable to adopt a position of measurement pixel for every five or less pixels in case of a fish-eye lens, or for every five to ten pixels in case of other types of lenses. Although the generator 100 described above as an example generates a calibration table, it may be possible for the generator 100 to include a predetermined function such as a function for interpolation according to data of nearby measurement pixels. Alternatively, it may be possible for the generator 100 to include not only a numerical expression to translate a position of pixel into a direction of incident beam of light, but also the other numerical expression to translate this position of pixel into its displacement.

Figure 8:
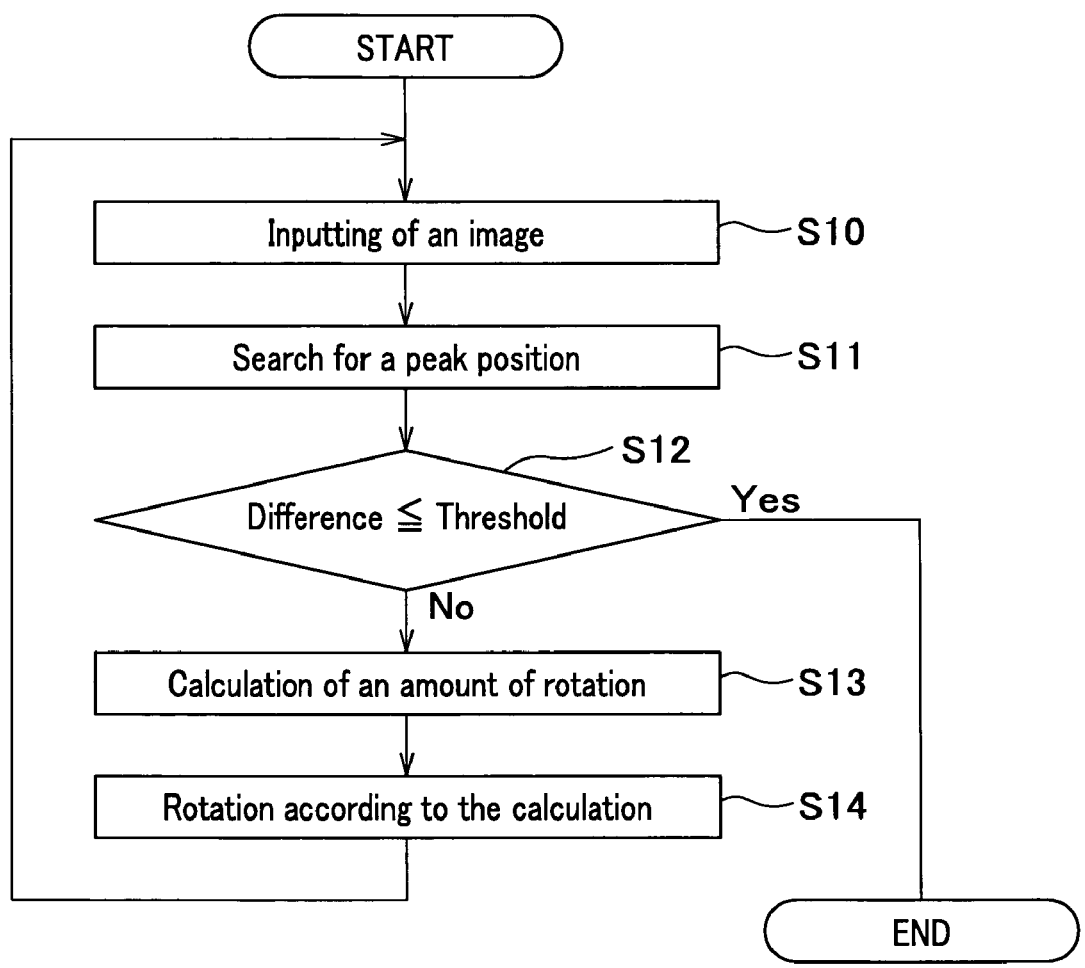
FIG. 8 is a flow chart showing the steps of a calibration information generator for determining a direction of incident beam of light.

Referring to FIG. 8 as well as FIG. 5, further description is given to how the camera unit C is rotated at the steps S1 and S4. FIG. 8 is a flow chart showing the steps by which the generator 100 directs an incident beam of light so as to impinge on a position of measurement pixel.

As shown in FIG. 8, at a step S10, the generator 100 incorporates an image captured by the camera unit C. In this connection, it is assumed that only the point light source L is on the image, namely a white point on the image against a background of black.

At a step S11, the generator 100 searches for a position (peak position) in which a maximum of the light intensity of white point falls.

Figure 9:
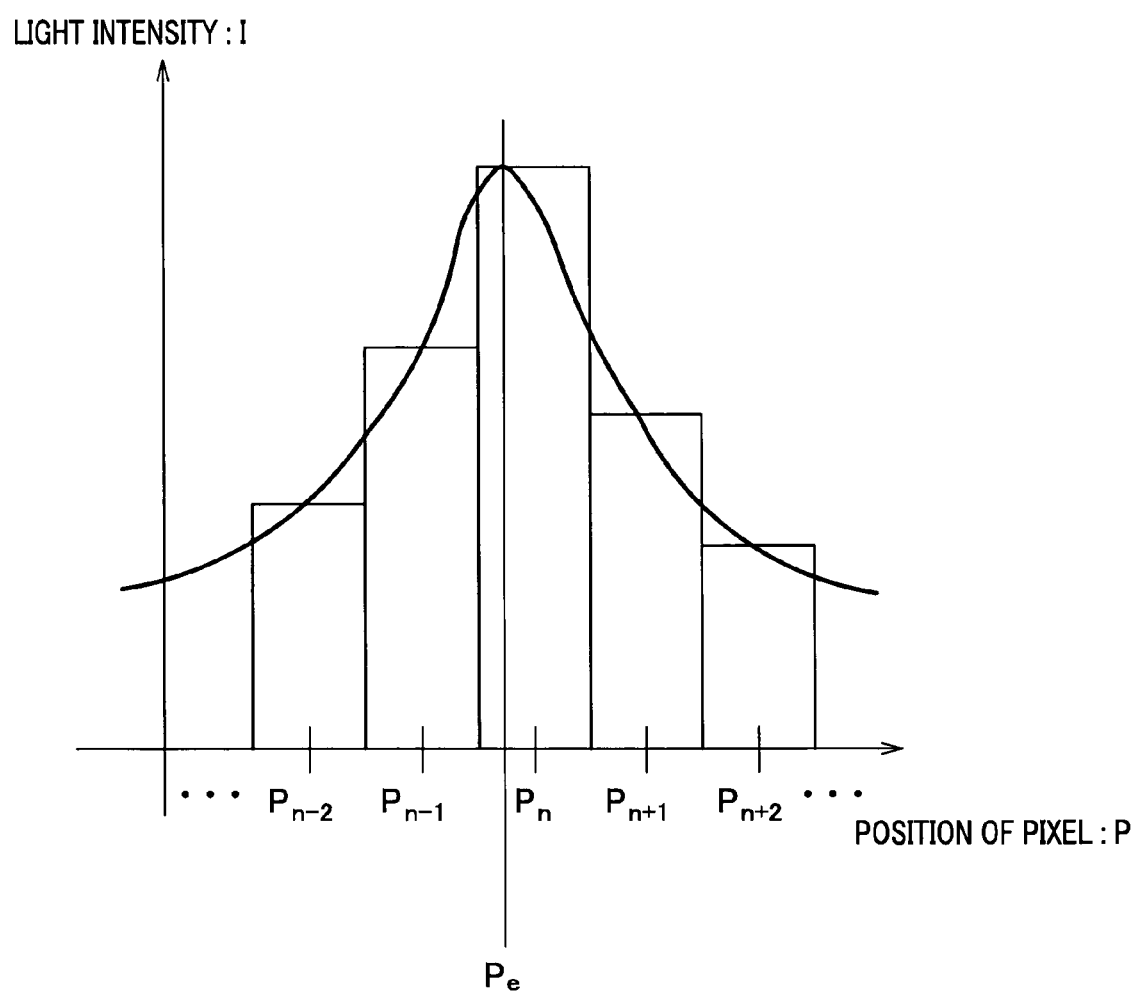
FIG. 9 is a diagram illustrating how to search for a peak position of lightness.

Referring to FIG. 9, description is given to how the generator 100 searches for the peak position. FIG. 9 is a graph illustrating the relationship between a position of pixel $P(\ldots, P_{n-2}, P_{n-1}, P_n, P_{n-1}, P_{n-2}\ldots)$ on the horizontal axis and light intensity I on the vertical axis. The light intensity I has a distribution with a peak at a certain pixel.

A peak position $P_e$ where the light intensity I takes the maximum value can be obtained by numerical expressions (4) and (5). It is defined that $I_n$ represents a light intensity at a position of pixel $P_n$; $I_{n-1}$ and $I_{+1}$ represent light intensities at positions of pixels $P_{n-1}$ and $P_{n+1}$ next to $P_n$, respectively.

If $I_{n-1} \leq I_{n+1}$:

$$P_e = P_n + (I_{n+1} - I_{n-1})/\{2(I_n - I_{n-1})\} \quad (4)$$

If $I_{n-1} > I_{n+1}$:

$$P_e = P_n + (I_{n+1} - I_{n-1})/\{2(I_n - I_{n+1})\} \quad (5)$$

In this connection, searching of the peak position $P_e$ is carried out by investigating light intensities of neighboring pixels in both vertical and horizontal directions.

At a step S12, the generator 100 judges if the difference between the peak position $P_e$ searched for at the step S11 and the position of a measurement pixel is less than or equal to a predetermined threshold value. If it is (Yes), judging that the peak position $P_e$ coincides with the position of this measurement pixel, the generator 100 terminates the flow.

If the difference is greater than the predetermined threshold value (No), at a step S13, the generator 100 converts the difference into angles, thereby calculating amounts of rotation required for the pan and tilt tables 111 and 112, respectively. At a step S14, the generator 100 rotates the pan and tilt tables 111 and 112 according to the amounts of rotation calculated at the step S13, and returns the flow to the step S10, repeating the flow until the peak position $P_e$ coincides with the position of the measurement pixel.

Although the operation of calibration information generator 100 has been described, which generates a calibration table with the method shown in FIG. 4A, it may be possible to generate it with the other method shown in FIG. 4B.

In this case, the generator 100 determines the position P1 of light source by moving the position of point light source L in at least one of Y and Z directions, positively or negatively so that the maximum light intensity of incident beam of light falls in the measurement pixel while the camera unit C is fixed. After changing the distance between the point light source L and the camera unit C in an X direction, the generator 100 similarly determines the position P2. In this way, determining the positions of P1 and P2 of the light source, the generator 100 specifies the direction of incident beam of light R. After repeating these steps according to the number of measurement pixels, the generator 100 conducts the steps S7 and S8, thereby generating a calibration table.

a. First Embodiment

Figure 10:
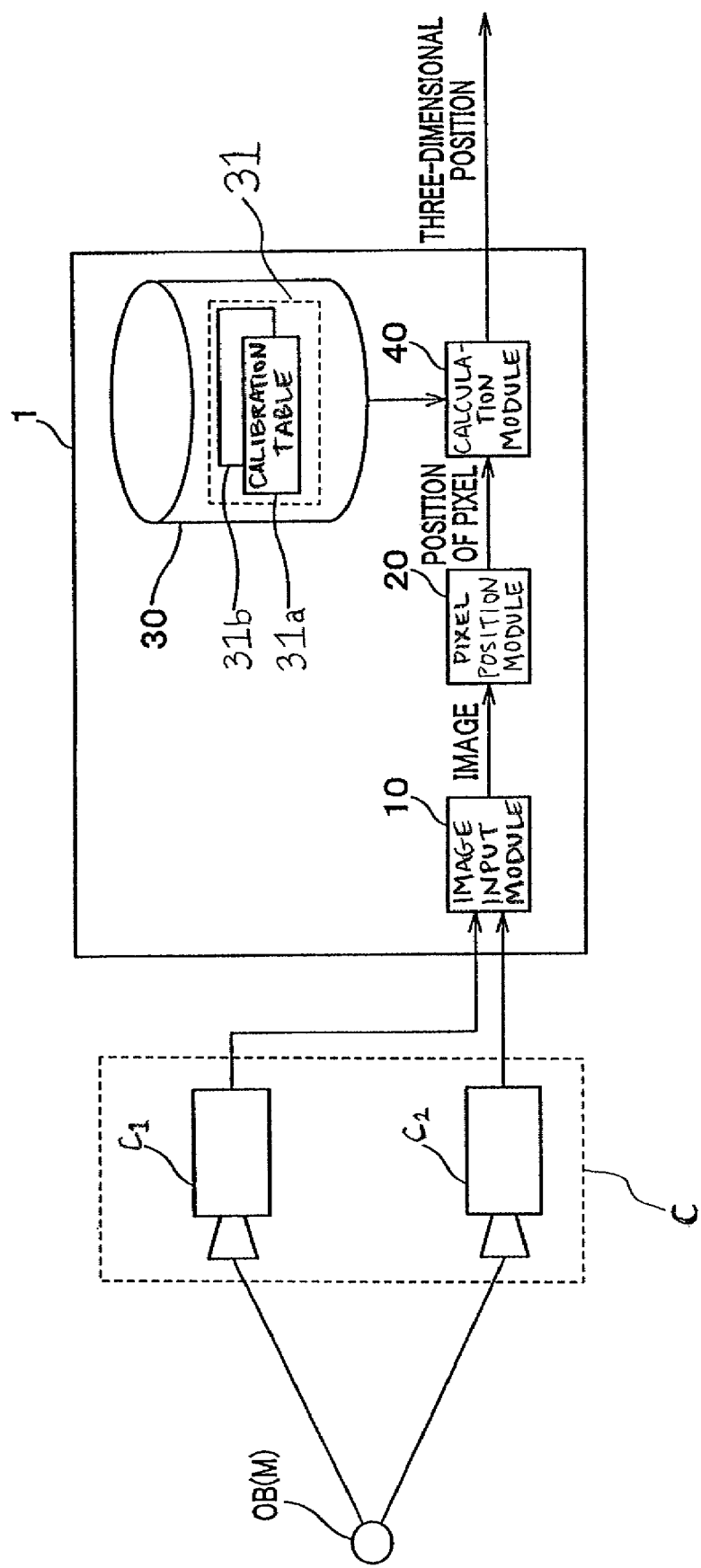
FIG. 10 is a block diagram illustrating the structure of a position measurement apparatus according to an embodiment of the present invention.

Referring to FIG. 10, description is given to a position measurement apparatus. FIG. 10 is a block diagram illustrating the structure of position measurement apparatus according to the present invention. A position measurement apparatus 1 can measure a three-dimensional position of an object OB (marker M) according to an image captured by a camera unit C, including a set of two cameras C1 and C2 (non-pinhole cameras), without any mask restricting an incident beam of light. The position measurement apparatus 1 includes an image input module 10, a pixel position module 20, a storage module 30 and a calculation module 40. The marker M, which is for indicating a spot for detection, includes a seal with a given color and shape, a light emitting diode of infrared beam and the like.

Referring to FIG. 10, description is given to a position measurement apparatus. FIG. 10 is a block diagram illustrating the structure of position measurement apparatus according to the present invention. A position measurement apparatus 1 can measure a three-dimensional position of an object OB (marker M) according to an image captured by a camera unit C, including a set of two cameras C1 and C2 (non-pinhole cameras). The position measurement apparatus 1 includes an image input module 10, a pixel position module 20, a storage module 30 and a calculation module 40. The marker M, which is for indicating a spot for detection, includes a seal with a given color and shape, a light emitting diode of infrared beam and the like.

The pixel position module 20 can detect the position of a pixel, which is representative of the object, in each of the images incorporated by the image input module 10. In case of a marker M is introduced, the center of gravity for an area containing the image of the marker M is considered the position of a pixel that is representative of the marker M. The position of the pixel detected for each image is sent to the calculation module 40.

The storage module 30, which is a storage medium such as a memory, stores a calibration table 31 correlating the calibration data with each of the pixels for each of the cameras C1 and C2. Calibration tables 31a and 31b are prepared for the cameras C1 and C2, respectively. The data of calibration table 31 includes the direction of an incident beam of light impinging on each of the pixels and the displacement $V_D$ from the reference point (the optical center O) to the incident beam of light, as described above with reference to FIG. 3.

As shown in FIG. 11, correlating with a set of coordinates x and y of a pixel, the calibration table 31 includes the displacement $V_D(d_x, d_y, d_z)$ of an incident beam of light relative to the optical center O and its direction in a form of angles $\alpha$ and $\gamma$, which are for specifying the incident beam of light impinging on the pixel.

It may alternatively be possible to adopt a given function or a transformational expression instead of the calibration table described above.

The calculation module 40 can calculate the position (three-dimensional position) of an object OB (marker M) according to the data of calibration table 31 which is correlated with the position of a pixel of an image detected by the pixel position module 20.

It may be possible to adopt other types of apparatus instead of the position measurement apparatus 1 described above. For example, it may be possible for the pixel position module 20 to execute matching of images captured by the camera unit C in a predetermined size of block so as to detect the position of a pixel representative of an object.

It may also be possible to use three or more cameras to measure the position of an object instead of the camera unit C including a set of two cameras C1 and C2. For example, it may be possible to adopt a set of nine cameras. In this case, assigning the camera positioned centrally as a reference camera, the position of the object can be more accurately measured by calculating an average of eight positions detected by combinations of the reference camera and the remaining eight cameras.

A computer program executes a computer so as to operate its processor and memory including the storage module 30, so that the image input module 10, pixel position module 20 and calculation module 40, which are included in the position measurement apparatus 1, are brought into operation.

Figure 12:
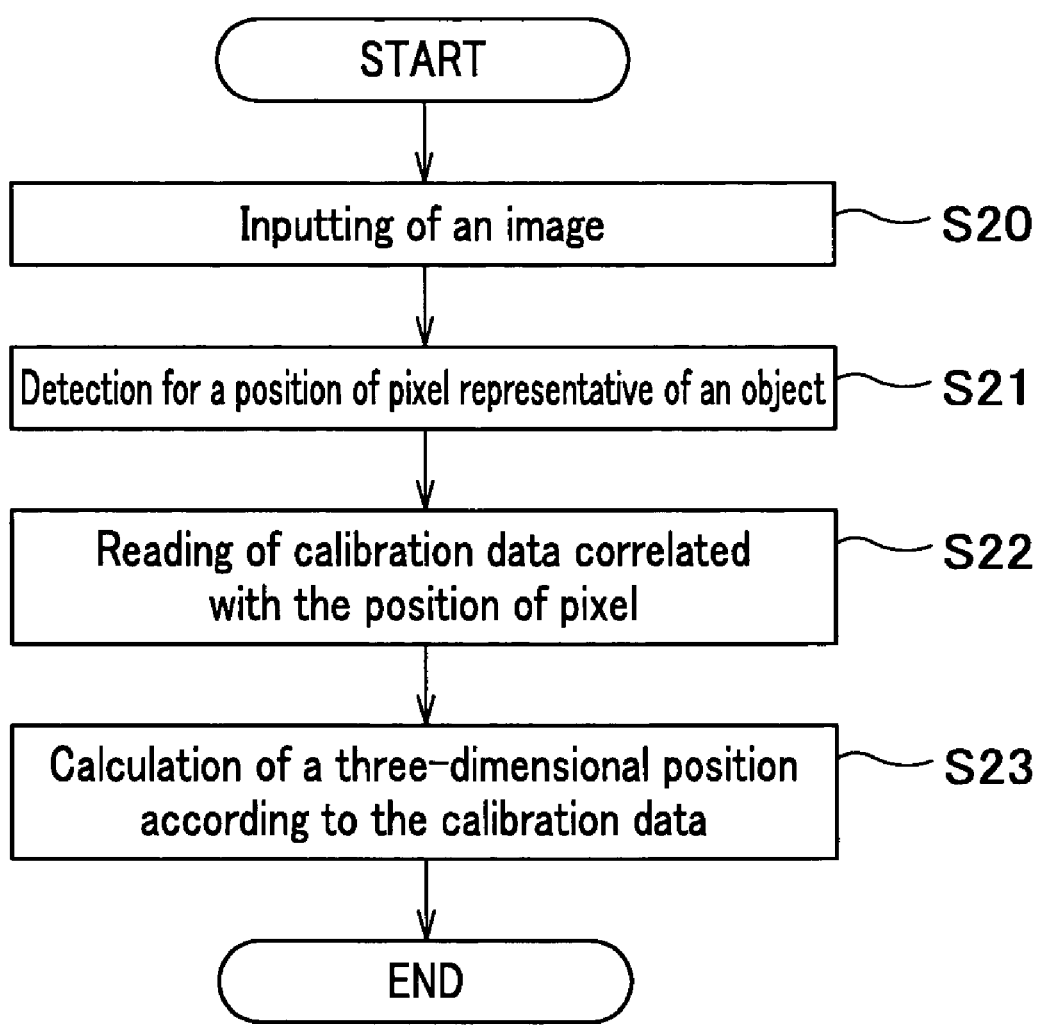
FIG. 12 is a flow chart illustrating the operation of a position measurement apparatus according to the present invention.

Referring to FIG. 12 in addition to FIG. 10, the operation of a position measurement apparatus 1 is described. FIG. 12 is a flow chart illustrating the operation of the apparatus 1.

At a step S20, an image input module 10 incorporates images captured by a camera unit C including two cameras C1 and C2. At a step S21, a pixel position module 20 detects a position of pixel representative of an object OB (marker M) in each of the images.

At a step S22, a calculation module 40 reads the calibration data, which is correlated with the position of pixel representative of the object OB, from one of calibration tables 31a and 31b that are prepared for the cameras C1 and C2, respectively. At a step 23, the calculation module 40 calculates a three-dimensional position of the object OB according to the calibration data.

Figure 13:
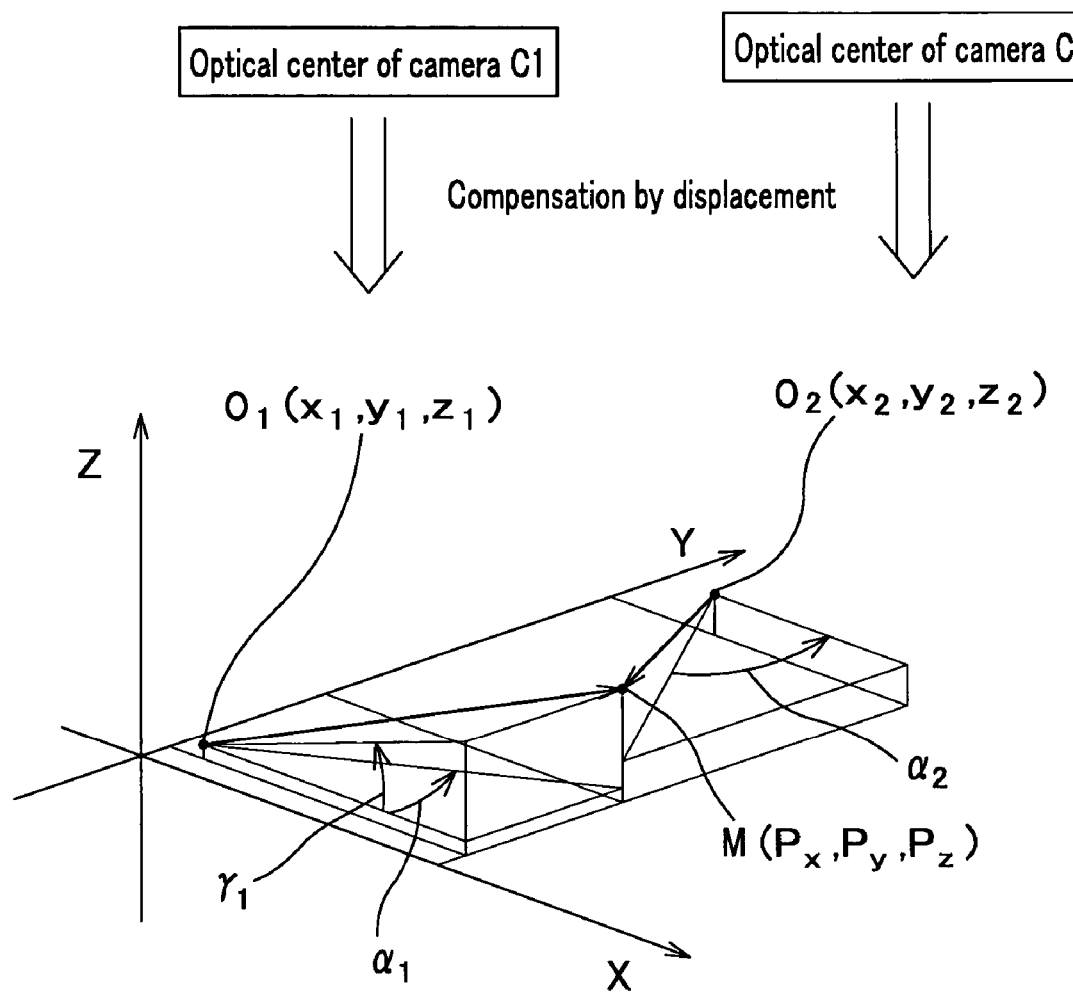
FIG. 13 is a schematic diagram describing a method for calculating the three dimensional position of an object.

Referring to FIG. 13 in addition to FIG. 10, detailed description is given to a method for calculating the three-dimensional position, which is conducted at the step S23. FIG. 13 is a schematic diagram describing the method for calculation.

As shown in FIG. 13, a compensated optical center is defined as $O_1(x_1, y_1, z_1)$, which is compensated according to a displacement derived from the calibration table 31a correlated with the position of pixel that is representative of the object OB in the image captured by the camera C1. Similarly for the image captured by the camera C2, the other compensated optical center is defined as $O_2(x_2, y_2, z_2)$, which is compensated according to a displacement derived from the calibration table 31b.

A direction of incident beam of light, which impinges on the position of pixel for the object OB in the image captured by the camera C1, is defined as an azimuth $\alpha_1$ and an elevation $\gamma_1$, which are obtained from the calibration table 31a. Similarly, the other direction of incident beam of light associated with the camera C2 is defined as an azimuth $\alpha_2$ and an elevation $\gamma_2$, which are obtained from the calibration table 31b. It is noted that the elevation $\gamma_2$ is not shown in FIG. 13 because it is not used for a calculation of position.

A position of object $M(P_x, P_y, P_z)$ can be calculated by numerical expressions (6), (7) and (8).

$$P_x = (x_1 \tan \alpha_1 - y_1 - x_2 \tan \alpha_2 + y_2)/(\tan \alpha_1 + \tan \alpha_2) \quad (6)$$

$$P_y = (P_x - x_1) \tan \alpha_1 - y_1 \quad (7)$$

$$P_z = (P_x - x_1) \tan \gamma_1 + z_1 \quad (8)$$

In this way, the position measurement apparatus 1, which employs non-pin-hole cameras, can accurately measure the position of object.

In this connection, it may be possible to apply a position measurement apparatus 1 according to the present invention to a movable robot, an automobile and the like. For example, introducing the apparatus 1 into the movable robot, it may be possible for the robot to walk stably on a floor because it can incorporate information on unevenness of the floor by conducting measurement for the position of floor with the apparatus 1.

b. Second Embodiment

Figure 14:
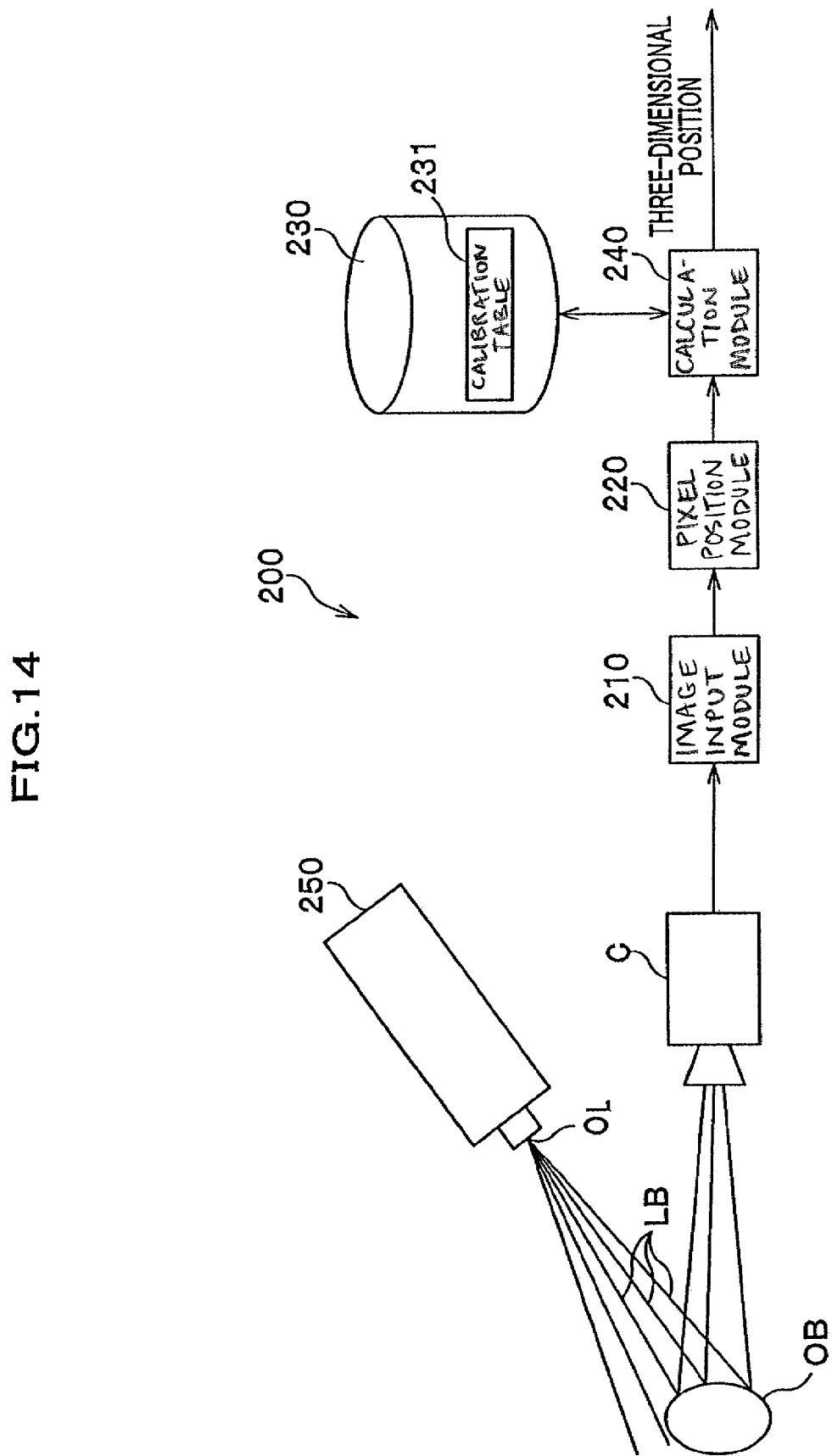
FIG. 14 is a block diagram illustrating the structure of a position measurement apparatus according to another embodiment the present invention.

A second embodiment of the present invention is described with reference to FIG. 14. FIG. 14 is a block diagram illustrating the structure of a position measurement apparatus according to the present invention. The same symbol is used for an item which is the same as that of the first embodiment and its description would not be repeated.

A position measurement apparatus 200 shown in FIG. 14, which has a camera unit C capturing an image of a collimated beam of light that originates from a laser unit 250 and impinges on an object OB, can determine a three-dimensional position of the object OB according to the image. The apparatus 200 swings the direction of beam of light upward-downward and right-left so that the position of object OB can be determined according to three-dimensional measurement conducted at a large number of points.

The apparatus 200 according to the second embodiment preferably includes, the laser unit 250, the camera unit C, an image input module 210, a pixel position module 220, a storage module 230 and a calculation module 240.

Figure 15:
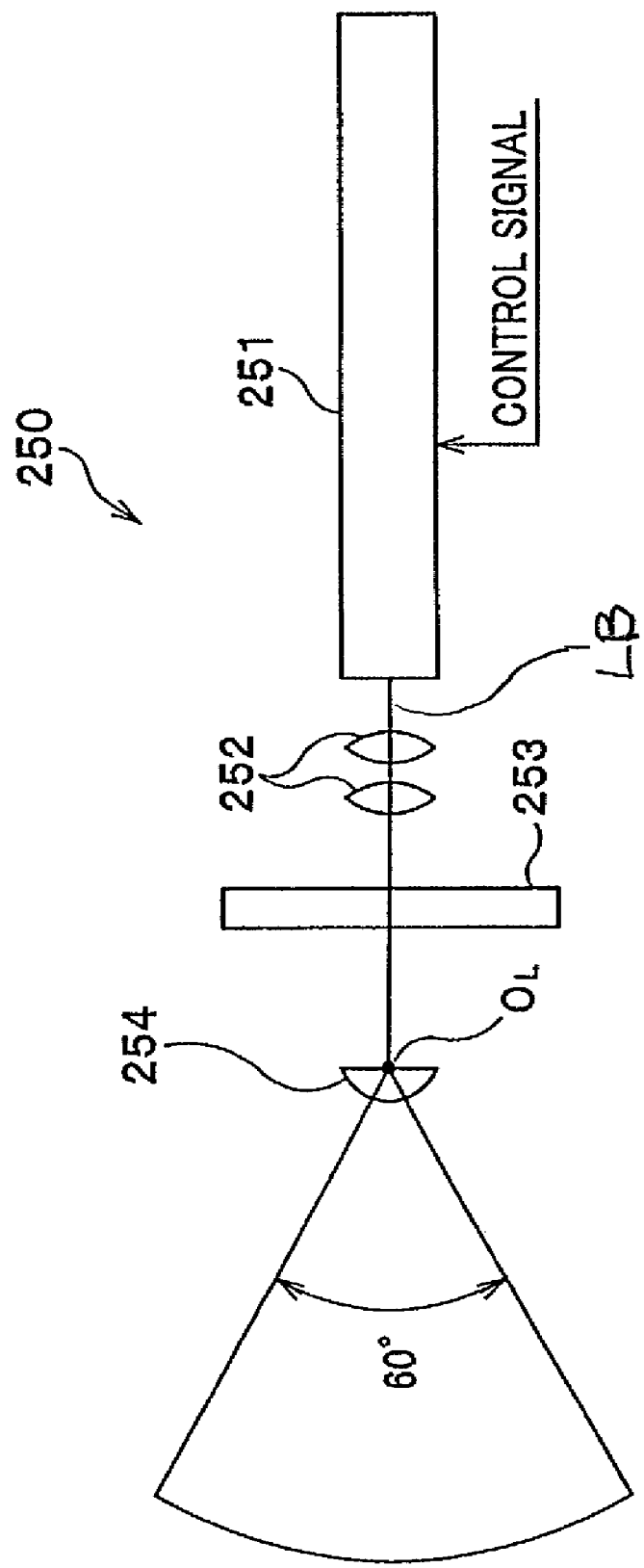
FIG. 15 is a block diagram for a laser unit according to the present invention.

As shown in FIG. 15, the laser unit 250 includes a laser gun 251, a condenser lens 252 and a diffraction gating 253. Brief description is given to each item below. The laser gun 251 produces a laser beam LB, the condenser lens 252 condenses the laser beam LB produced by the laser gun 251 and the diffraction grating 253 disperses the laser beam LB condensed by the condenser lens 252. The diffraction grating 253 disperses the laser beam LB in a vertical direction.

After the diffraction grating 253, a diffusion lens 254 is placed for diffusing the dispersed laser beams in one direction so as to form a slit of light. The diffusion lens 254 includes a cylindrical lens and the like. The diffusion lens 254 diffuses each of the laser beams at an angle of 60 deg.

Figure 16:
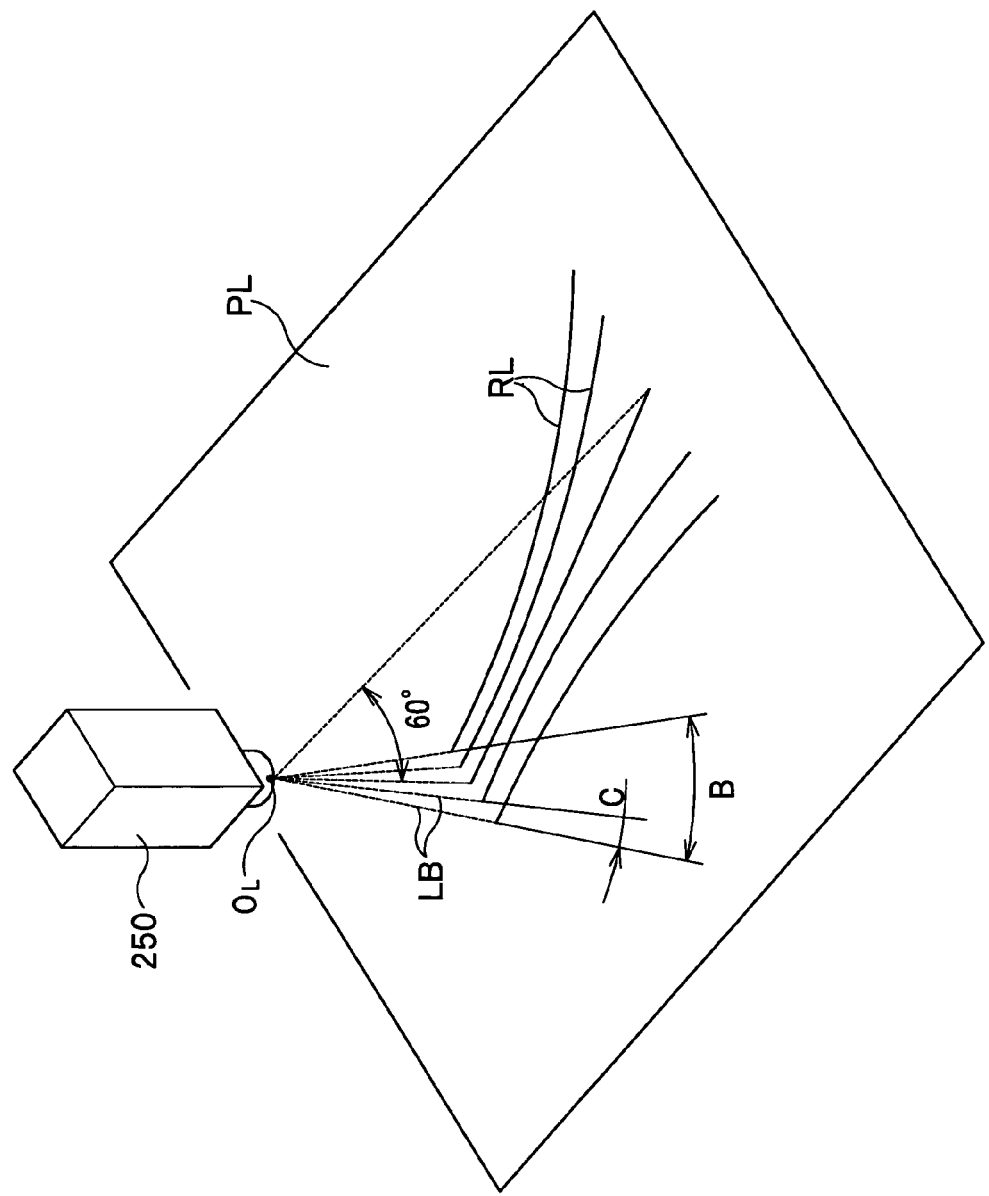
FIG. 16 is a perspective view illustrating illuminated laser beams.

As shown in FIG. 16, the laser beam LB emitted by the laser unit 250 is diffused in a conical shape, reflecting and scattering in a form of a trajectory RL of quadratic curve on a plane PL. The reflection and scattering of the laser beam LB indicates a position illuminated by the laser beam LB. The laser beam LB is dispersed into five beams, each of which is diffused in an angle of 60 deg. Each of these laser beams is emitted radially from an origin $O_L$, which is individually defined for each beam. It may be practically preferable to adopt another larger number of beams than five described above, which is selected for explanation as an example. For example, if an angle B of 32 deg. and an angle C of 1.6 deg. between a pair of neighboring beams are selected, the number of beams results in twenty one.

It may be alternatively possible to adopt a rotation mechanism so as to rotationally position a spot laser beam in upward (x) and lateral (y) directions instead of a lens system for diffraction and diffusion used in the laser unit 250 described above. In this case, it may be preferable to arrange the mechanism so that the laser beam can be radially emitted from a sole point so as to relieve the effort associated with calculation of the position of an object.

The image input module 210 can incorporate an image of the object OB captured by the camera unit C. The image is in a form of color or monochromatic multi-gradation image. The image input module 210 has a memory (not shown) which temporarily stores images captured by the camera unit C, to which the pixel position module 220 makes access.

The pixel position module 220 can detects the position illuminated by the laser beam LB in the image incorporated by the image input module 210, thereby determining the position of pixel. More specifically, judging from the distribution of lightness on the image, the pixel position module 220 detects a pixel which has the peak of lightness. The position of pixel thus detected for each of the images is sent to the calculation module 240.

Figure 17:
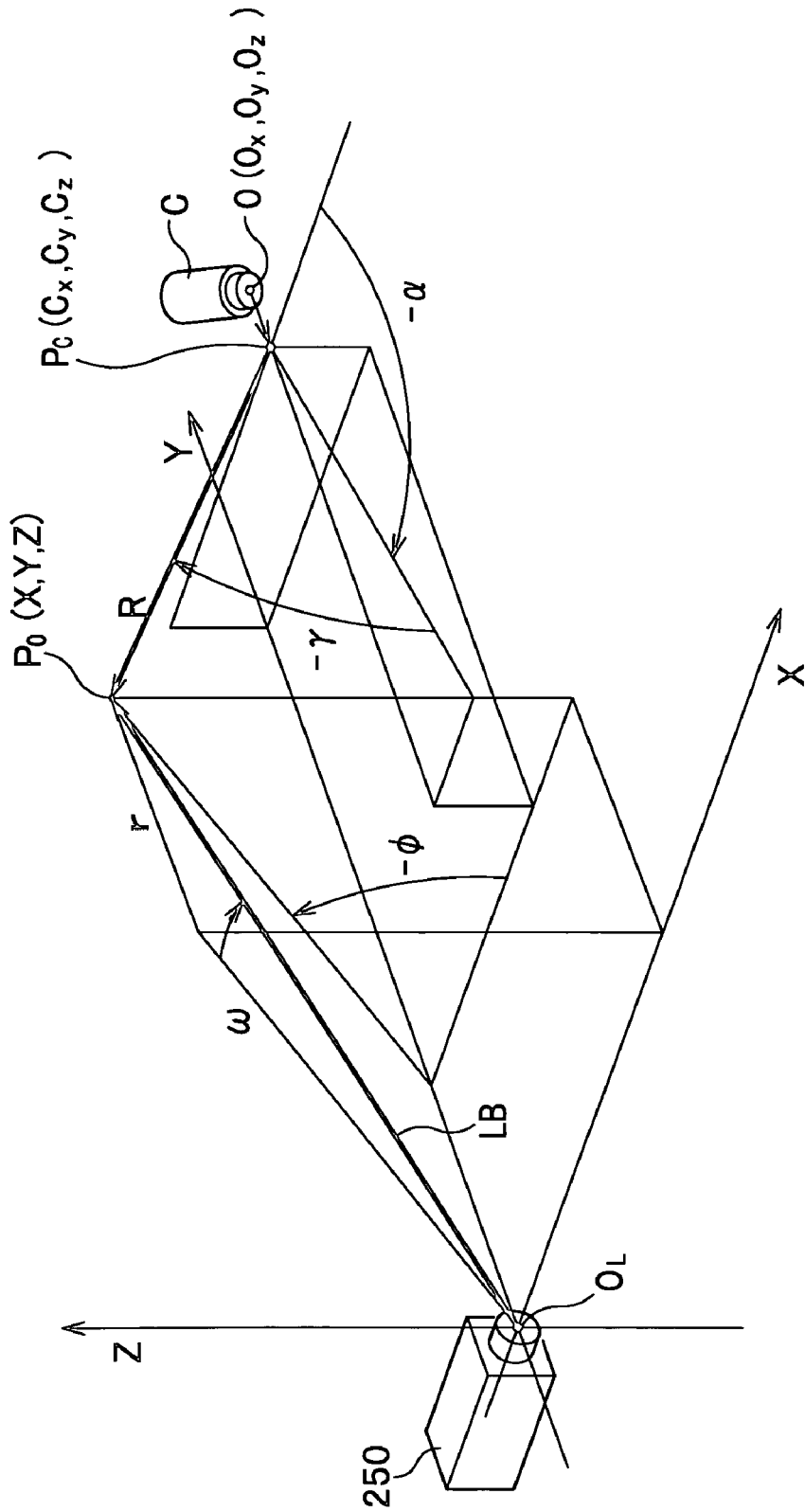
FIG. 17 is a diagram showing a coordinate system and the definition for angles which are used in description of calculation method for a position illuminated by a laser beam.

The storage module 230, which is preferably made of a common storage medium such as a hard disk, stores a calibration table 231 which correlates calibration data with each of the pixels of the image captured by the camera unit C. As shown in FIG. 11, correlating with a set of coordinates x and y of a pixel, the calibration table 231, which is for determining the incident beam of light impinging on the pixel, includes a displacement $V_D(d_x, d_y, d_z)$ relative to an optical center O and a direction in a form of angles $\alpha$ and $\gamma$. As shown in FIG. 17, the angle $\alpha$ is an azimuth relative to an X-Z plane of Cartesian coordinates (X, Y, Z) whose origin is arranged to coincide with the origin $O_L$ of the laser beam LB emitted by the laser unit 250. On the other hand, the angle $\gamma$ is an elevation relative to an X-Y plane.

The calculation module 240 calculates a position (three-dimensional position) of the object OB according to the data of calibration table 231, which is correlated with the position of pixel of each of the images detected by the pixel position module 220.

Figure 18:
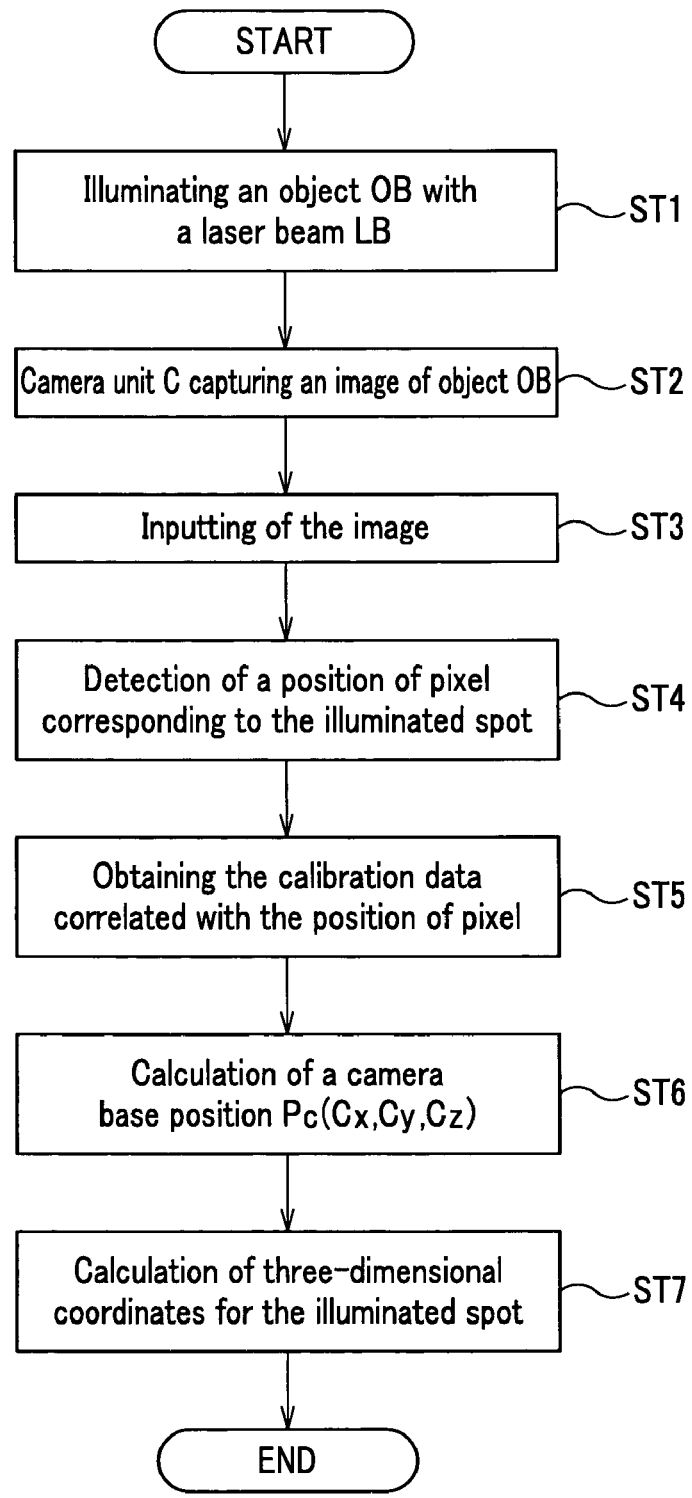
FIG. 18 is a flow chart showing the steps for operating a position measurement apparatus according to the present invention.

Referring to FIGS. 17 and 18, the operation of a position measurement apparatus 200 is described. FIG. 18 is a flow chart showing the steps for operating the apparatus 200.

At a step ST1, the apparatus 200 illuminates an object OB with a laser beam LB. At a step ST2, a camera unit C captures an image of the object OB. At a step ST3, an image input module 230 incorporates the image captured at the step ST2.

At a step ST4, a pixel position module 220 detects a peak of lightness on the image which is incorporated by an image input module 210, thereby determining a position of pixel which corresponds to the spot illuminated by the laser beam LB on the object OB.

At a step ST5, accessing to a calibration table 231, a calculation module 240 obtains the calibration data correlated with the position of pixel determined at the step ST4. At a step ST6, the calculation module 240 calculates a camera base position $P_c(C_x, C_y, C_z)$ according to the calibration data obtained at the step ST5.

As shown in FIG. 17, the camera base position $P_C$ is meant to represent an origin from which a vector of line-of-sight for the camera unit C starts. If the optical center of camera unit C is defined as $O(O_x, O_y, O_z)$, the camera base position $P_C$ is represented by the following numerical expressions.

$$C_x = O_x + d_x$$

$$C_y = O_y + d_y$$

$$C_z = O_z + d_z$$

In this connection, it may be possible to prepare a calibration table 231 which correlates the camera base position $P_c(C_x, C_y, C_z)$ instead of the displacement $V_D(d_x, d_y, d_z)$ with a position of pixel.

At a step ST7, the calculation module 240 calculates a position illuminated by the laser beam LB according to the camera base position $P_c(C_x, C_y, C_z)$, the angles $\alpha$ and $\gamma$ derived from the calibration table 231 in addition to angles ω and φ which define the direction of laser beam LB. If the distance of an object is limited, limited laser beams impinge on a given area of image. Therefore in this case, it may be possible to determine a laser beam according to the position of a pixel, so that the angles ω and φ are accordingly determined. If a laser unit is arranged so that it can mechanically swing a spot beam, it may be preferable to mechanically or electrically measure the direction to which the spot light is directed. In this way, it may be possible to incorporate the angles ω and φ, which are synchronized with the image, into the calculation module 240, which calculates a position illuminated by the laser beam LB.

The calculation of a position is conducted as described below.

As shown in FIG. 17, it is defined that a distance from the origin of the laser beam LB to an illumination point $P_o(X, Y, Z)$ is r and the other distance from the camera base position $P_C$ of camera unit C to $P_o(X, Y, Z)$ is R.

The illumination point $P_o(X, Y, Z)$ is geometrically related to the direction vector of laser beam LB having a distance of r in the following numerical expressions (9), (10) and (11).

$$X = r \cos \omega \quad (9)$$

$$Y = r \sin \omega \quad (10)$$

$$Z = -r \cos \omega \sin \phi \quad (11)$$

The relationship between the illumination point $P_o(X, Y, Z)$ and the line-of-sight vector of camera unit C having a distance of R is also represented by the following numerical expressions (12), (13) and (14).

$$X = R \cos \alpha \cos \gamma + C_x \quad (12)$$

$$Y = R \sin \alpha \cos \gamma + C_y \quad (13)$$

$$Z = -R \sin \gamma + C_z \quad (14)$$

The distances r and R can be derived from these expressions (9) through (14).

For $0 \leq Cy$ and $0 \leq \omega$, or $Cy < 0$ and $\omega \leq 0$:

$$R = (-B + \sqrt{(B^2 - 4AC)})/2A$$

For ω=0:

$$R = -C_y/\sin \alpha \cos \gamma$$

For $0 \leq Cy$ and $\omega < 0$, or $Cy < 0$ and $0 \leq \omega$:

$$R = (-B - \sqrt{(B^2 - 4AC)})/2A$$

For ω=0:

$$r = (R \sin \alpha \cos \gamma + C_y)/\sin \omega$$

Where A, B and C are defined as follows:

$$A = \cos^2 \alpha \cos^2 \gamma + \sin^2 \gamma - \cos^2 \omega \sin^2 \alpha \cos^2 \gamma / \sin^2 \omega$$

$$B = C_x \cos \alpha \cos \gamma - C_z \sin \gamma - C_y \cos^2 \omega \sin \alpha \cos \gamma / \sin^2 \omega$$

$$C = C_x^2 + C_z^2 - C_y^2 \cos^2 \omega / \sin^2 \omega$$

The position measurement apparatus 200 according to the present invention, which compensates the non-pin-hole characteristics of the camera unit C, can accurately measure the position illuminated by a laser beam. Therefore, it may also be possible to measure a three dimensional shape for the object OB by conducting calculation of three-dimensional positions for all positions illuminated by the laser beam LB.

In this connection, it may be possible to apply a position measurement apparatus 200 according to the present invention to a movable robot, an automobile and the like. The apparatus, which is mounted on the movable robot so as to detect a floor, can accurately recognize unevenness of the floor, thereby allowing the robot to walk stably.

Although there have been described what are the present embodiments of the invention, it will be understood by persons skilled in the art that variations and modifications may be made thereto without departing from the spirit and essence of the invention whose scope is indicated by the appended claims.

What is claimed is:

1. A method for measuring a position of an object according to an image of the object captured by a camera unit wherein the object is contained within the image captured by the camera unit, the method comprising the steps of:

capturing an image containing an object using a camera unit with a lens system;

calculating a discrepancy of an incident beam of light penetrating the lens system of the camera unit relative to an optical center of the lens system; and compensating a position of the object contained in the captured image according to the calculated discrepancy;

wherein the camera unit is adapted to be positioned on one of an automobile and a movable robot, and the method includes the further step of outputting the compensated position of the object to the automobile or the movable robot;

wherein a distance between the object and the camera unit is not known prior to measuring the position of the object;

wherein the incident beam of light is directly projected from the object to the lens system; and wherein said discrepancy is a minimum distance between the optical center and said incident beam of light.

2. A method for measuring a position of an object according to claim 1, wherein said discrepancy calculating step involves use of calibration information for the camera unit prepared in advance, wherein said method further involves generating said calibration information in the steps of:

projecting a beam of light on individual pixels of a camera image;

according to the beam of light incident on each pixel, calculating a displacement from a reference point to the incident beam of light; and generating the calibration information by correlating a direction and the displacement of the incident beam of light with a position of each pixel.

3. A method for measuring a position of an object according to claim 1, wherein said discrepancy calculating step involves use of calibration information for the camera unit prepared in advance, wherein said method further involves generating said calibration information in the steps of:

adjusting a first direction of the camera unit so that a first peak intensity of light emitted by a light source falls in a measurement pixel captured by the camera unit, and measuring a first relative position of the light source relative to the camera unit;

adjusting a second direction of the camera unit so that a second peak intensity of light emitted by the light source falls in the measurement pixel, and measuring a second relative position of the light source relative to the camera unit;

repeating determination of an incident beam of light impinging on the measurement pixel according to the first and second relative positions for predetermined measurement pixels;

calculating a displacement from a reference point to the incident beam of light for each of the measurement pixels; and generating the calibration information which correlates a direction and the displacement of the incident beam of light with each of the measurement pixels.

4. A method according to claim 1, further comprising the step of outputting the compensated position of the object as an actual position of the object.

5. A method for measuring a position of an object with a combination of an image of the object captured by a camera unit and calibration information for the camera unit, the calibration information being prepared in advance in such a manner that a position of a measurement pixel of the image is correlated with a direction of an incident beam of light and a displacement from a reference point to the incident beam, the method comprising the steps of:

(a) capturing an image containing an object using a camera unit with a lens, the object being contained within the image captured by the camera unit;

(b) detecting a position of a pixel representative of the object in the image captured at step (a); and (c) calculating the position of the object contained in the captured image according to the direction and the displacement of the incident beam, which are obtained from the calibration information with reference to the position of the pixel detected at step (b);

wherein the camera unit is adapted to be positioned on one of an automobile and a movable robot, and the method includes the further step of outputting the compensated position of the object to the automobile or the movable robot;

wherein the displacement of the incident beam of light relative to the reference point is a discrepancy of the incident beam of light relative to an optical center of the lens of the camera unit;

wherein said discrepancy is a minimum distance between the optical center and said incident beam of light;

wherein the incident beam of light is directly projected from the object to the lens of the camera unit; and wherein the position of the object detected in step (b) is compensated according to said discrepancy.

6. A method according to claim 5, further comprising the step of outputting the calculated position of the object as an actual position of the object.

7. An apparatus for measuring a position of an object according to an image of the object captured by a camera unit wherein the object is contained within the image captured by the camera unit, the apparatus comprising:

an image input means for incorporating the image captured by the camera unit;

a pixel position detection means for detecting a position of a pixel representative of the object in the image incorporated by the image input means;

a storage means for storing calibration information which correlates the position of the pixel with both a direction of an incident beam of light originating from the object and a displacement from a reference point to the incident beam; and a position calculation means for calculating the position of the object according to the direction and the displacement of the incident beam, which are derived from the calibration information with reference to the position of the pixel detected by the pixel position detection means;

wherein the camera unit is adapted to be positioned on one of an automobile and a movable robot, and the apparatus is operable to output the calculated position of the object to the automobile or the movable robot;

wherein said displacement of the incident beam indicates a discrepancy of the incident beam of light penetrating a lens system of the camera unit relative to an optical center of the lens system;

wherein said discrepancy is a minimum distance between the optical center of the lens system and said incident beam of light;

wherein said incident beam of light is directly projected from the object to the lens system of the camera unit; and wherein the position of the object is compensated according to said discrepancy.

8. The apparatus according to claim 7, wherein the camera unit comprises cameras in sets of at least two so as to take a plurality of images and the storage means stores the calibration information for each of said cameras.

9. The apparatus according to claim 7, wherein the pixel position detection means detects the position of the pixel representative of the object having a marker identifying a typical spot of the object.

* * * * *